US009213128B2

(12) United States Patent
Walter et al.

(10) Patent No.: US 9,213,128 B2
(45) Date of Patent: Dec. 15, 2015

(54) ISOTROPIC OPTICAL FILTER AND METHOD OF MANUFACTURING THEREOF

(75) Inventors: Harald Walter, Horgen (CH); Alexander Stuck, Wettingen (CH)

(73) Assignee: CSEM CENTRE SUISSE D'ELECTRONIQUE ET DE MICROTECHNIQUE SA - RECHERCHE ET DEVELOPPEMENT, Neuchatel (CH)

( * ) Notice: Subject to any disclaimer, the term of this patent is extended or adjusted under 35 U.S.C. 154(b) by 0 days.

(21) Appl. No.: 13/285,008

(22) Filed: Oct. 31, 2011

(65) Prior Publication Data
US 2012/0162770 A1 Jun. 28, 2012

(30) Foreign Application Priority Data

Nov. 1, 2010 (CH) ........................... 1821/10

(51) Int. Cl.
*G02B 5/18* (2006.01)
*G02B 27/44* (2006.01)
(Continued)

(52) U.S. Cl.
CPC .............. *G02B 5/1809* (2013.01); *B42D 25/29* (2014.10); *B42D 25/328* (2014.10); *B42D 2035/14* (2013.01); *B42D 2035/24* (2013.01)

(58) Field of Classification Search
CPC ........... B42D 15/0013; B42D 2035/22; B42D 2035/44; B42D 15/00; B42D 15/105; B42D 2033/18; G02B 5/1809; G02B 27/0944; G02B 5/1842; G02B 13/00; G02B 27/0037

USPC ......... 359/558, 566, 567, 569, 570, 573, 574, 359/575
See application file for complete search history.

(56) References Cited

U.S. PATENT DOCUMENTS

| 4,484,797 | A | 11/1984 | Knop et al. |
| 2007/0247714 | A1* | 10/2007 | Schnieper et al. ............ 359/558 |

(Continued)

FOREIGN PATENT DOCUMENTS

| EP | 0105099 | 4/1984 |
| EP | 1862827 | 12/2007 |

(Continued)

OTHER PUBLICATIONS

Communication pursuant to Article 94(3) EPC by the European Patent Office for EP application No. 11186874.1 dated Mar. 11, 2014.
D. Rosenblatt et al., "Resonant Grating Waveguide Structures", in IEEE Journal of Quantum Electronics, vol. 33, No. 11, 1997.

*Primary Examiner* — Thomas K Pham
*Assistant Examiner* — Sharrief Broome
(74) *Attorney, Agent, or Firm* — Young & Thompson

(57) ABSTRACT

The present invention discloses an isotropic optical filter comprising high-index refraction material positioned between low-index-refraction matter. At least some of the high-index refraction material has a grated structure and lateral and vertical dimensions with respect to the low-index-refraction matter such that the high-index refraction material is operative to act as a leaky waveguide for light incident on the ZOF. The grated structure comprises at least two different grating patterns. Each of the at least two grating patterns constitutes a subpixel. A plurality of subpixels is operative to diffract incident light to at least two zero-order wavelength spectra respective of the at least two grating patterns such to exhibit an isotropic color effect with respect to the rotational orientation of the isotropic optical filter. The plurality of subpixels constitute an isotropic pixel.

14 Claims, 22 Drawing Sheets

(51) Int. Cl.
*B42D 25/29* (2014.01)
*B42D 25/328* (2014.01)

(56) References Cited

U.S. PATENT DOCUMENTS

| | | | |
|---|---|---|---|
| 2008/0024866 A1* | 1/2008 | Walter et al. | 359/569 |
| 2008/0278815 A1* | 11/2008 | Blondiaux et al. | 359/568 |
| 2008/0311307 A1* | 12/2008 | Bulovic et al. | 427/466 |
| 2009/0263071 A1* | 10/2009 | Stuck et al. | 385/12 |
| 2010/0315713 A1* | 12/2010 | Walter et al. | 359/568 |

FOREIGN PATENT DOCUMENTS

| | | |
|---|---|---|
| EP | 1990661 | 11/2008 |
| EP | 2077459 | 4/2009 |
| JP | 8075912 | 3/1996 |
| JP | EP 2077459 A4 * | 4/2009 |
| WO | WO2004044059 | 5/2004 |
| WO | WO2004077468 | 9/2004 |

* cited by examiner

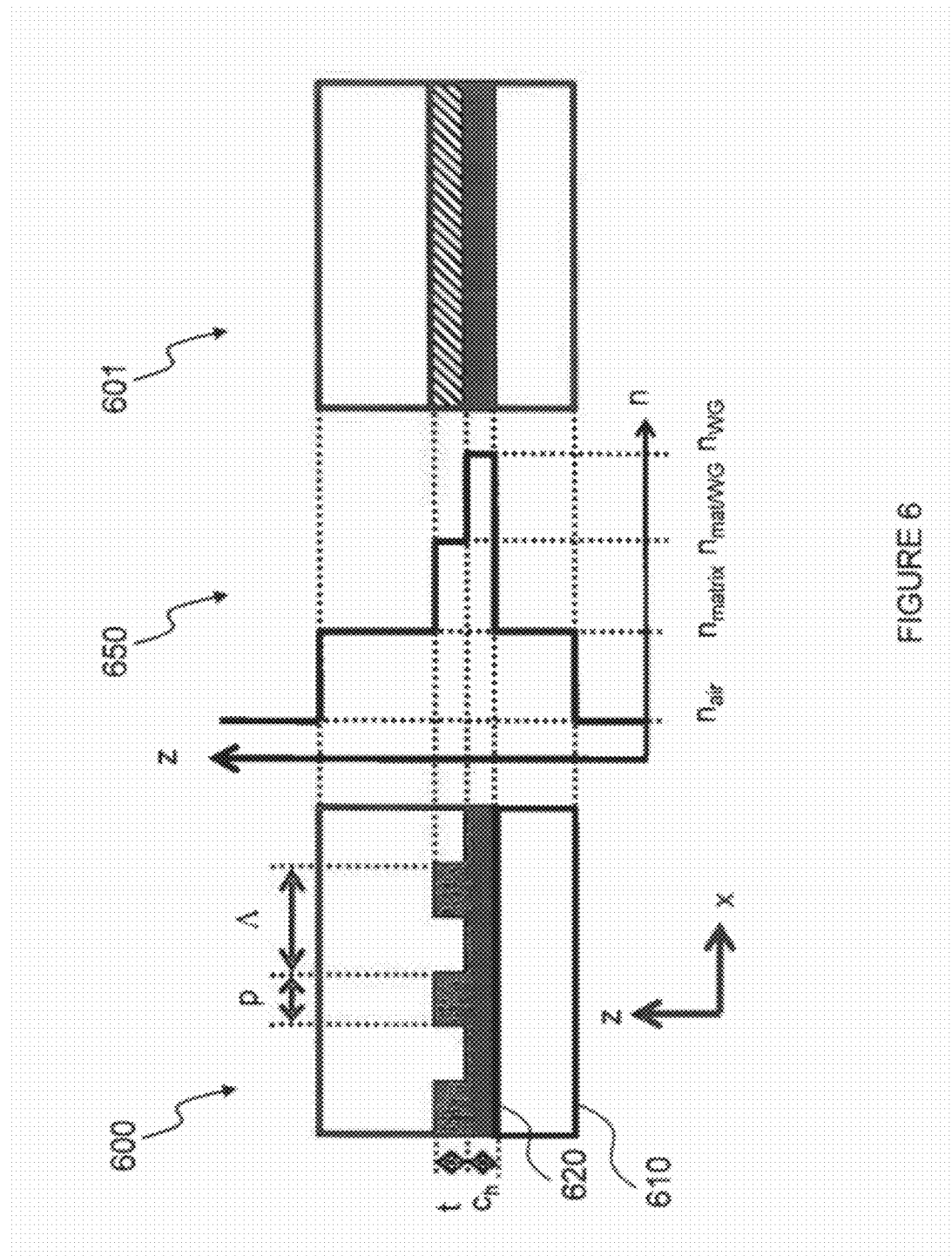

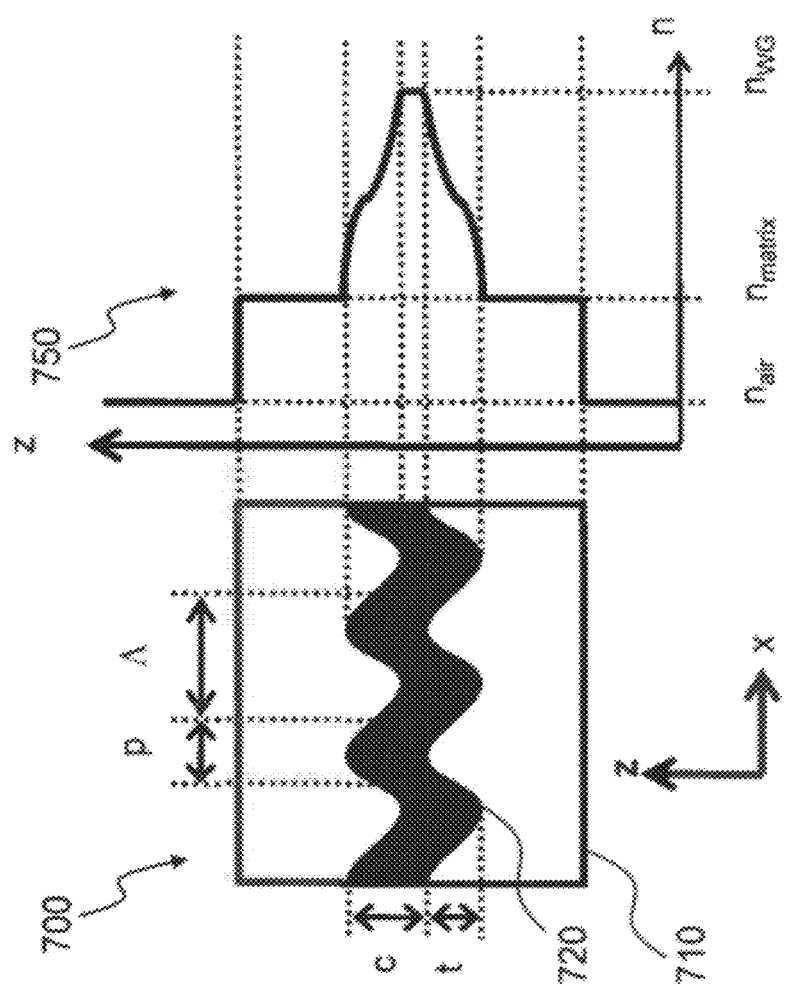

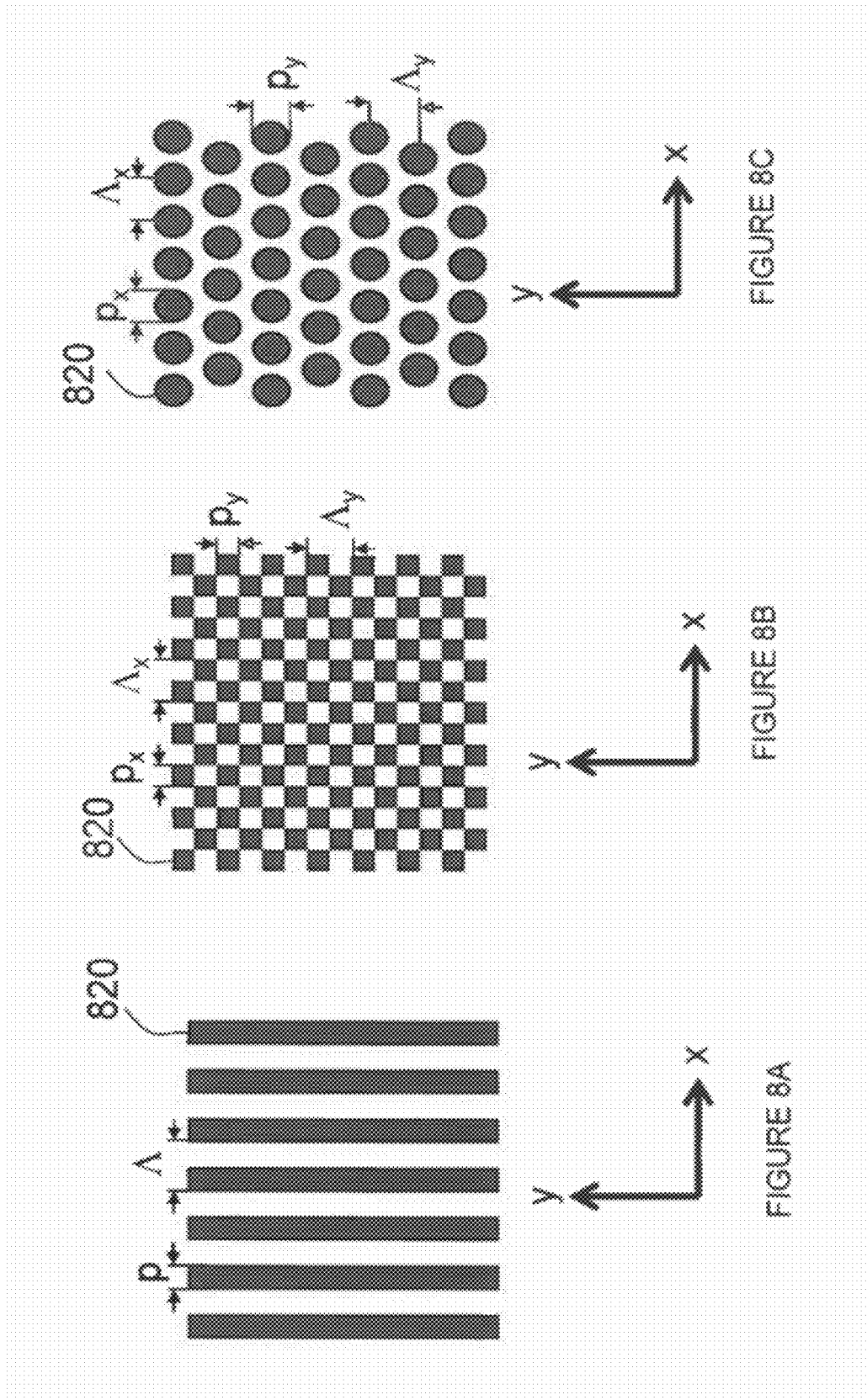

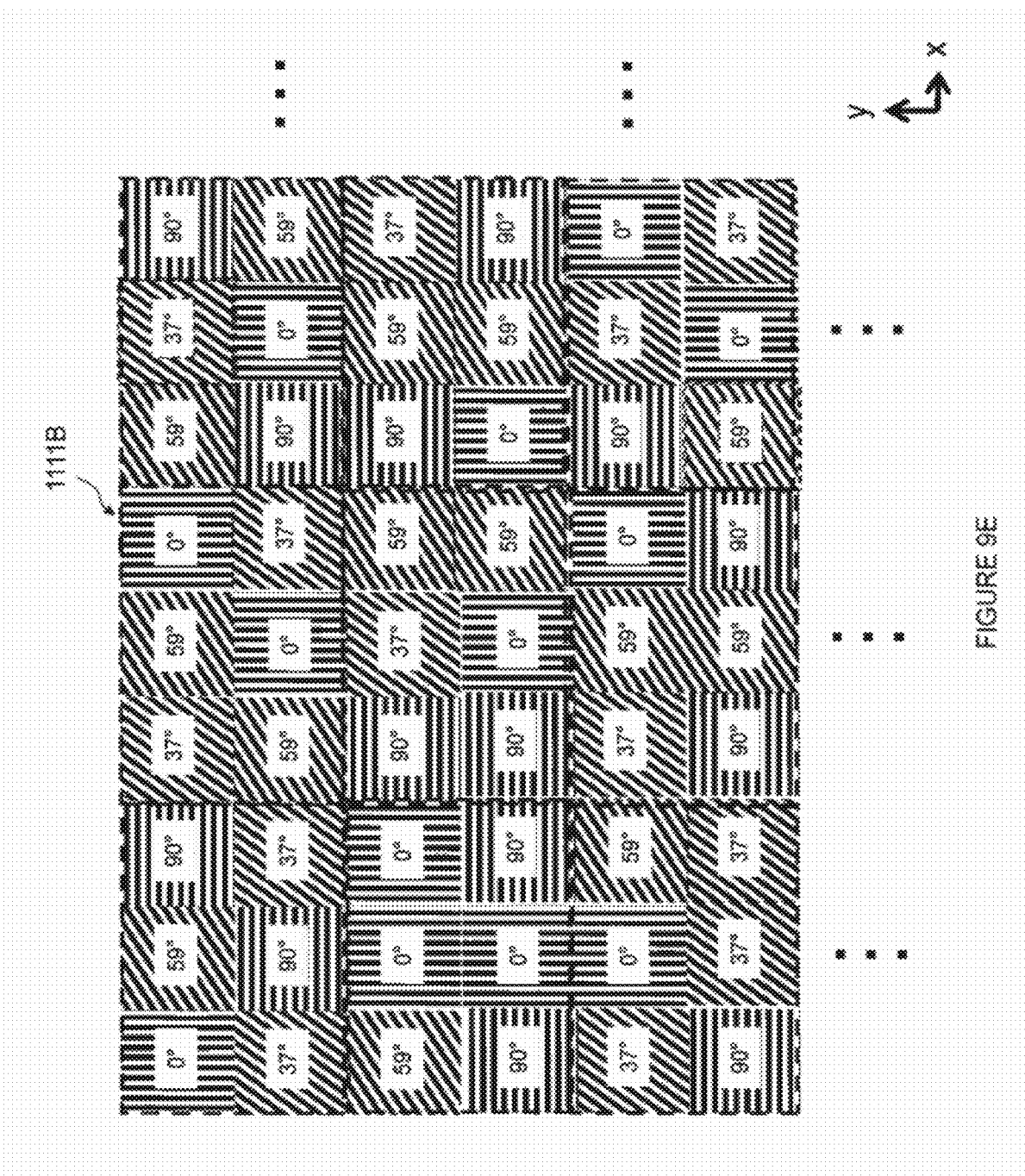

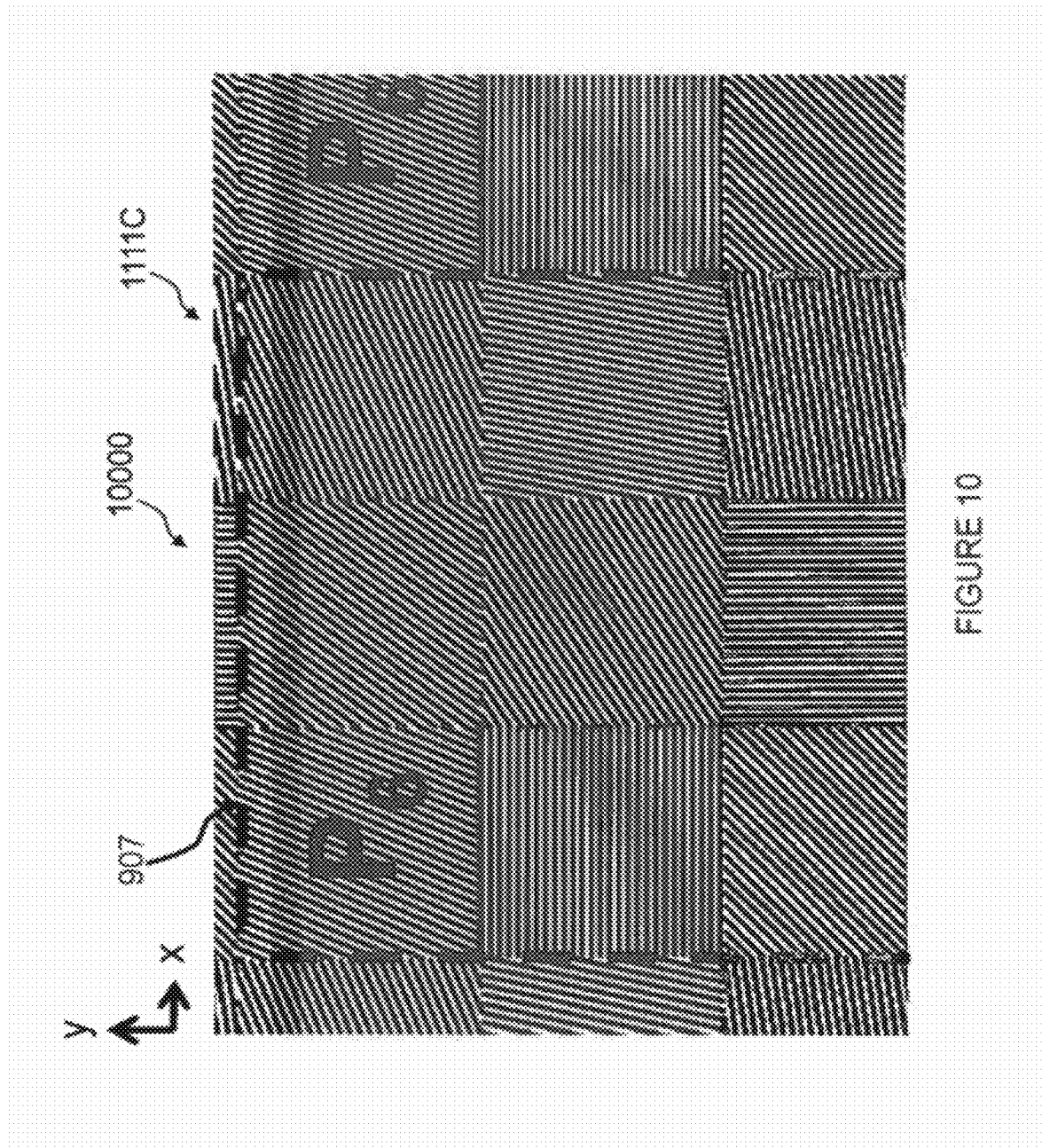

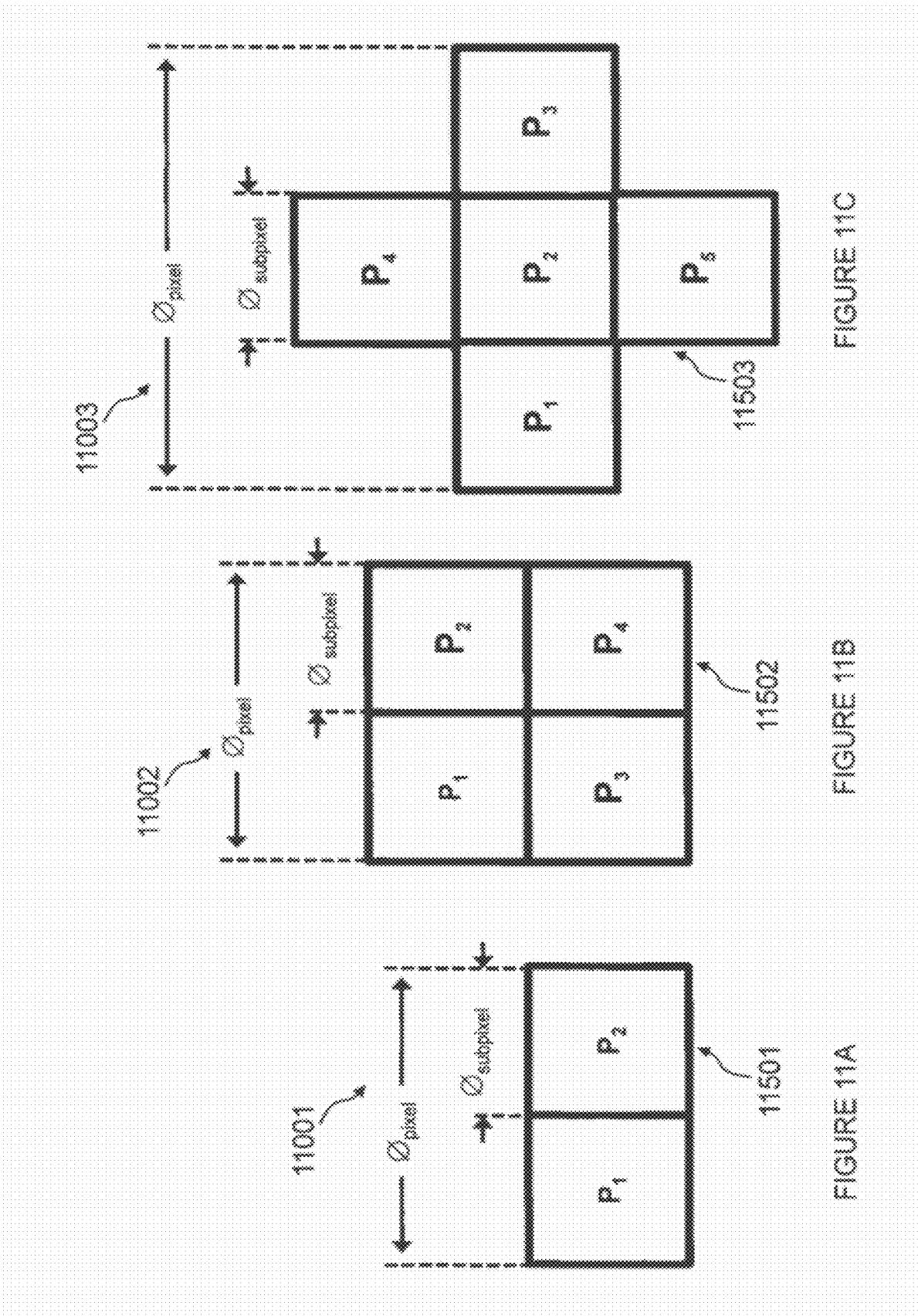

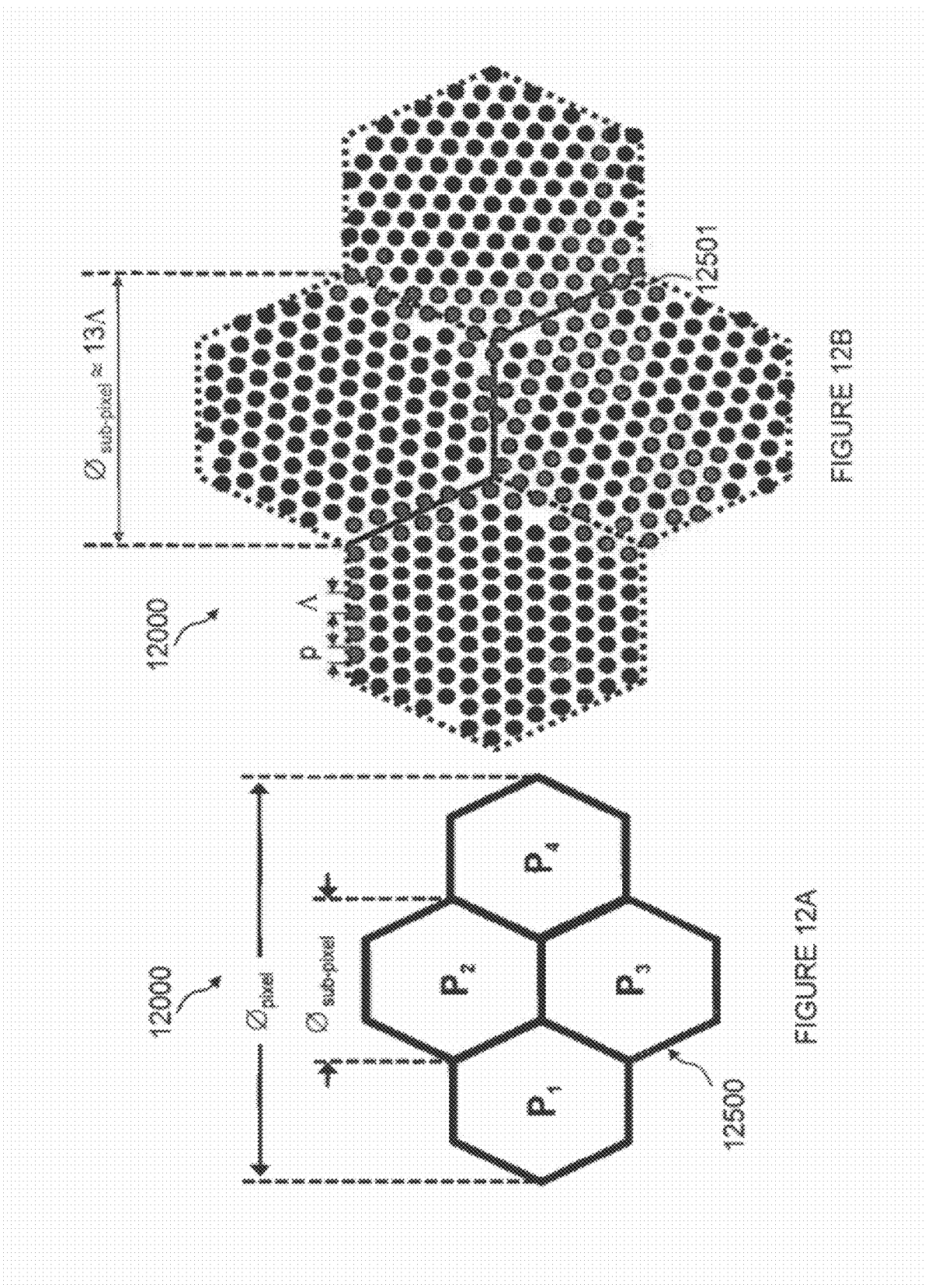

ISOTROPIC OPTICAL FILTER AND METHOD OF MANUFACTURING THEREOF

FIELD OF THE INVENTION

The invention pertains to optical filters and more specifically, to Zero-Order Diffractive Filters.

BRIEF DESCRIPTION OF THE FIGURES

These and further features and advantages of the invention will become more clearly understood in the light of the ensuing description of embodiments thereof, given by way of example only, with reference to the accompanying figures, wherein:

FIG. 6 is a schematic side view illustration of a sixth ZOF as known in the art, of the corresponding index of refraction profile in Z-direction, and of the corresponding VE multilayer design, assuming homogeneous layers in the X-Y-plane with the respective averaged indices of refraction;

FIG. 7 is a schematic side view illustration of a seventh ZOF as known in the art and of the corresponding index of refraction profile in Z-direction;

FIG. 8A is a schematic top view illustration of a linear grating structure as known in the art;

FIG. 8B is a schematic top view illustration of a crossed grating structure of a chessboard-like grating type as known in the art;

FIG. 5C is a schematic top view illustration of a hexagonal dot grating structure as known in the art;

FIG. 9E is a schematic top vie illustration of an isotropic colour filter comprising a plurality of isotropic pixels, according to an embodiment of the invention;

FIG. 10 is a schematic sectional image of an implementation of an isotropic colour filter according to another embodiment of the invention;

FIG. 11A is a schematic top view illustration of an isotropic pixel, according to a yet alternative embodiment of the invention;

FIG. 11B is a schematic top view illustration of an isotropic pixel, according a yet other embodiment of the invention;

FIG. 11C is a schematic top view illustration of an isotropic pixel, according to a further alternative embodiment of the invention;

FIG. 12A is a schematic top view illustration of a grating pattern layout of an isotropic pixel having a hive-like structure;

FIG. 12B is a schematic top view illustration of an isotropic pixel having a hive-like structure, according to an embodiment of the invention;

Figure 1:
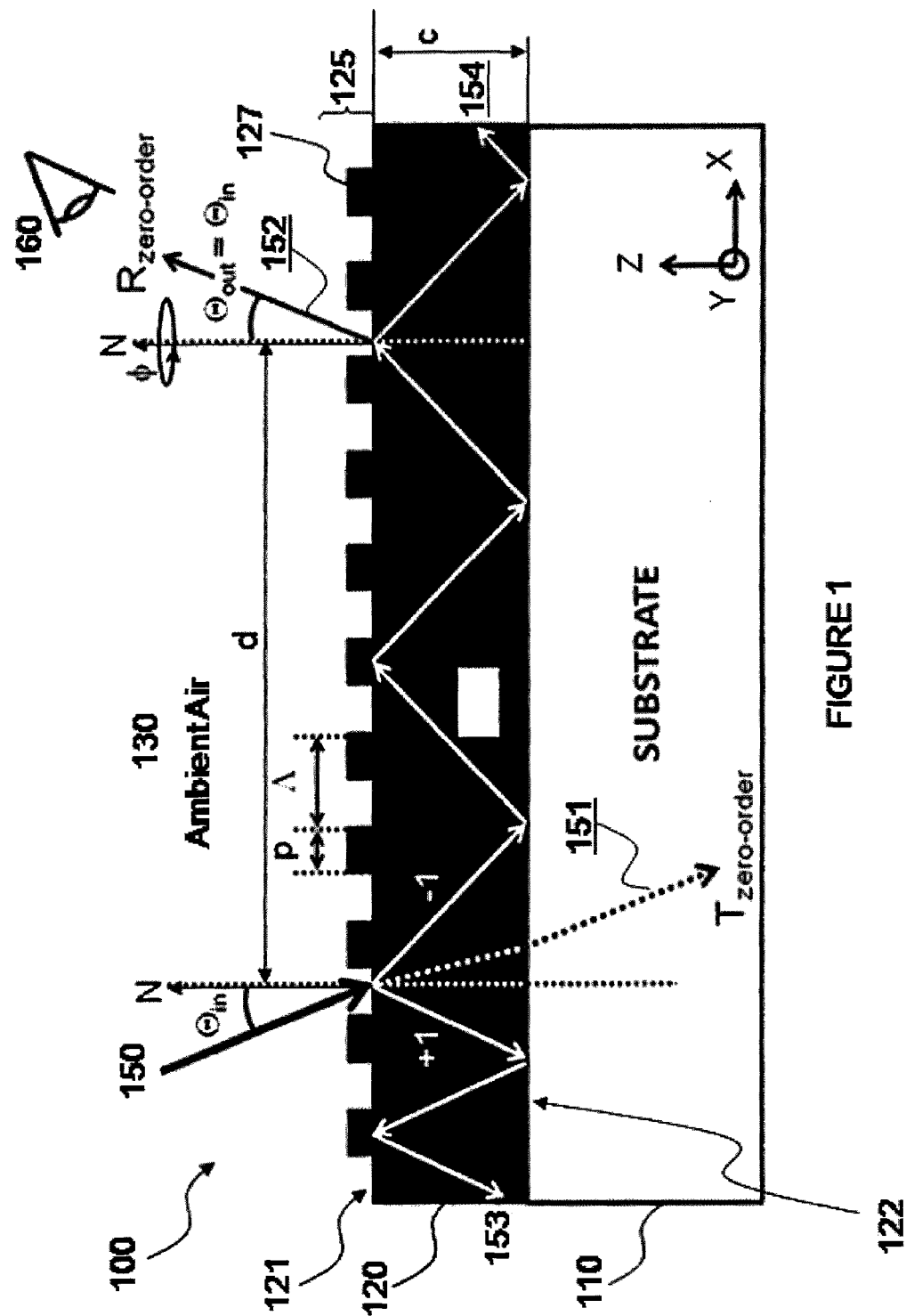
FIG. 1 is a schematic side-view illustration of a first zero-order diffractive filter as known in the art, and of the corresponding behaviour of light incident thereon.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical elements but may not be referenced in the description for all figures.

BACKGROUND OF THE INVENTION

Zero-order diffractive filters (ZOFs), sometimes dubbed resonant gratings or guided mode resonant filters, are optical filters that are based on the resonant reflection of a leaky waveguide. Illuminated for example with non-polarized, polychromatic light, ZOFs can exhibit characteristic colour effects upon rotation and are therefore clearly identifiable. D.

Rosenblatt et al. describe such ZOFs in "Resonant Grating Waveguide Structures", in IEEE Journal of Quantum Electronics, Vol. 33, No. 11, 1997.

ZOFs employ a layer of a high-index refraction material that has a diffractive microstructure defining at least one of its waveguiding boundaries. The diffractive microstructure features a period Λ and a depth t. The period Λ is in most cases smaller than the wavelength of light for which ZOF is designed.

The resulting waveguiding layer respective of the high-index refraction material has a thickness c and is made of a material having an index of refraction $n_{high}$ that is higher than index of refraction ($n_{low}$) of the matter surrounding the high-index refraction material. The matter surrounding the high-index refraction material is therefore herein referred low-index refraction matter.

In order to obtain zero-order diffraction colour effects that are recognizable by the human eye, a number of parameters have to be adjusted including grating period Λ, grating depth t, thickness c of the waveguiding layer, fill factor or duty cycle f.f.=p/Λ, grating profile or shape (rectangular, sinusoidal, triangular or more complex) and the indices of refraction of the high-index refraction material $n_{high}$ and the low-index refraction matter $n_{low}$. More specifically, in order to obtain waveguiding properties typical of ZOFs, the index of refraction of the high-index refraction material $n_{high}$ may have to be at least higher by a value of 0.1 compared to the index of refraction of the low-index refraction matter $n_{low}$. The high-index refraction matter is thus sometimes dubbed high-index wave guiding layer or simply waveguiding layer.

Depending on the desired properties of the ZOF, the low-index refraction matter has different indices of refraction. For example, a first low-index refraction matter can be made of a solid substrate, whilst a second low-index refraction matter can be ambient air. The second low-index refraction matter may have a different index of refraction than the solid substrate. The diffractive grating can therefore be exposed to ambient air.

For some implementations, ZOFs include a plurality of alternatingly arranged layers of high-index refraction material and low-index refraction matter and/or gradient index of refraction material.

Referring to FIG. 1, a ZOF 100 as known in the art comprises in the x/y-plane a waveguiding layer 120 having lower boundary 122 engaging with a substrate 110. Upper boundary 121 of waveguiding layer 120 is formed as a diffractive grating 125, which includes a plurality of protrusions 127 that are spaced apart from one another, and which is at the interface between waveguiding layer 120 and ambient air 130. The physical properties of diffractive grating 125 are at least defined by its physical dimensions, and more specifically, by its grating period Λ, the width p of protrusions 127 and thickness c of waveguiding layer 120. The fill factor (ff) or duty cycle of diffractive grating 125, can be defined as ff=p/Λ, which may be approximately equal 0.5 or 50%. Waveguiding layer 120 has an index of refraction that is higher than that of air and that of substrate 110. Thusly configured, at least some of polarized or unpolarized polychromatic visible light 150 incident on diffractive grating 125 at an illumination angle $\Theta_{in}$ is coupled in waveguiding layer 120. Specifically, ZOF 100 may enable the resonant coupling of light of several diffraction orders and thus of several wavelengths into waveguiding layer 120. The diffraction orders and the wavelengths that will be coupled into waveguiding layer 120 depend on at least one parameter of diffractive grating 125, the thickness c of waveguiding layer 120 and differences in the index of refraction between waveguiding layer 120, substrate 110 and ambient air 130".

The resonant coupling of incident light 150 into waveguiding layer 120 is schematically shown and exemplified as "+1" order light 153 and "−1" order light 154 having orders +1 and −1, respectively. Due to the higher index of refraction of high-index refraction material 120 compared to the one of ambient air 130 and substrate 110, "+1"-order light 153 and "−1"-order light 154 are totally internally reflected from upper boundary 121 and lower boundary 122 of waveguiding layer 120. However, a first portion of the zeroth-order (hereinafter: first zeroth-order light) 151 of incident light 150 is directly transmitted through waveguiding layer 120 and leaves ZOF 100 by propagation through substrate 110. In addition, a second portion of the zeroth-order (hereinafter: second zeroth-order light) 152 of light 150 is diffracted together with "−1" order light 154 into waveguiding layer 120. Both second zeroth-order light 152 and "−1"-order light 154 propagate in waveguiding layer 120 in opposite directions. After propagating over a distance d in waveguiding layer 120, second zeroth-order light 152 is coupled out via diffractive grating 125.

"+1" order light 153 and "−1" order light 154 may continue propagating in high-index refraction material 120. In contrary to what is true for diffraction orders that are higher than zero, the angle $\Theta_{out}$ (which is defined with respect to the normal N of waveguiding layer 120) of the outcoupled second zeroth-order light 152 is equal to $\Theta_{in}$. This is the reason why the effect is called zero-order diffraction".

These amendments correct typographical errors which appear in the published application. These amendments do not add new matter to the application.

The resonance condition for the outcoupling of first zeroth-order light 151 and second zeroth-order light 152, can be tailored for a certain wavelength or wavelength spectrum for the outcoupled light. For example, the wavelength(s) of second zeroth-order light 152 outcoupled via diffraction grating 125 depends both on the viewing angle $\Theta_{out}$ and the rotational orientation φ of diffractive grating 125 with respect to a viewing direction 160. For each pair of angles φ and $\Theta_{out}$ a particular spectral range or colour is reflected or transmitted.

The spectral characteristics of such ZOFs are therefore tuneable. The reflection spectra $R_{zero-order}$ or transmission spectra $T_{zero-order}$ are the most prominent examples of the spectral characteristics of ZOFs. As long as the materials employed in a ZOF possess no substantial absorption, the transmission spectra are the complement of those in reflection.

Additional reference is now made to FIGS. 2 to 7, which schematically show side view illustrations of respective ZOFs as known in the art, the profile of the corresponding index of refraction in Z-direction, and the profile in Z-direction of the corresponding VE multilayer design, assuming homogeneous layers in the X-Y-plane with the respective averaged indices of refraction.

Figure 2:
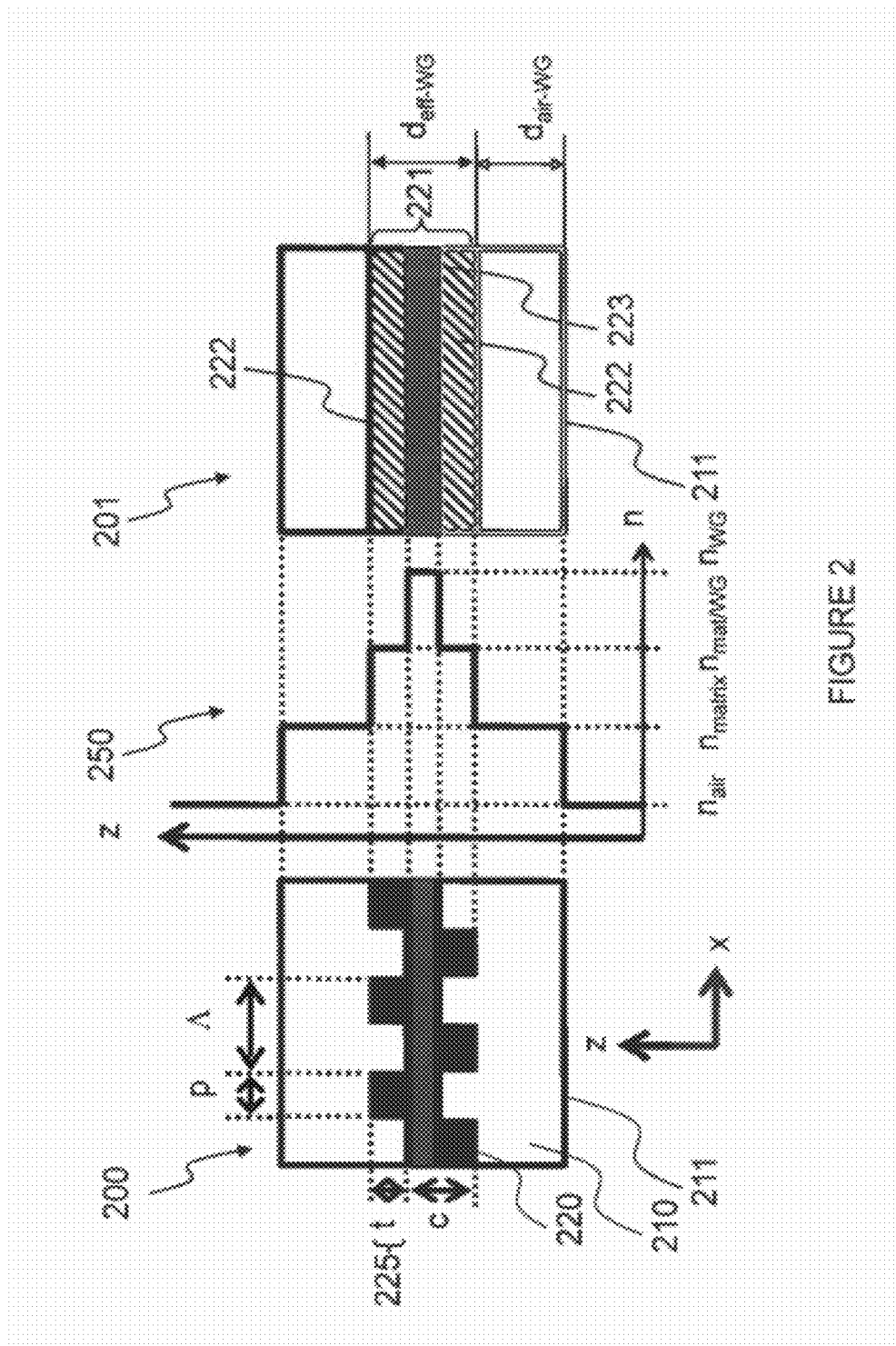
FIG. 2 is a schematic side view illustration of a second ZOF as known in the art, of the corresponding index of refraction profile in Z-direction, and of the corresponding virtual equivalent (VE) multilayer design assuming homogeneous layers in the X-Y-plane with the respective averaged indices of refraction.

More specifically, FIG. 2 schematically illustrates a side view of a second ZOF 200 which includes high-index refraction material 220 that is disposed between upper and lower low-index refraction matter 210. Second ZOF 200 possesses diffractive rectangular grating lines of depth t on both the upper and lower interfaces of high-index refraction material 220 with low-index refraction matter 210. First the corresponding index of refraction profile 250 shows a step like increase from $n_{air}$ to $n_{matrix}$ followed by a step like increase to $n_{mat/WG}$. With respect to an VE first ZOF 201, the index of refraction in the grated area of first ZOF 200 is in first approximation the average of the indices of high-index refraction material 200 and low-index refraction matter 210 weighted by the fill factor ff of rectangular grating profile 225. The configuration of second ZOF 200 results in a VE waveguiding layer 221.

With respect to VE second ZOF 201, the following equation applies:

$$n_{mat/WG} = (1-f\!f) \times n_{low} + f\!f \times n_{WG} \quad (1)$$

The core of VE waveguiding layer 221 has an index of refraction $n_{WG}$. The symmetric design of second ZOF 200 and the fill factor of 50% results in the same steps in the indices of refraction on the lower side of second ZOF 200. Such a design can be realised e.g. by embossing the grating lines in a substrate followed by a vacuum coating of a high-index refraction material with the mass thickness c. Evaporation of ZnS or sputtering of $TiO_2$ are two examples. Finally a relatively thick top layer with $n_{low}$ needs to be disposed. In second ZOF 200 the thickness c has to be thicker than the depth t of rectangular grating profile 225.

As is schematically illustrated with respect to VE second ZOF 201, a VE third layer 223 is obtained. Second ZOF 200 includes therefore a VE multilayer design comprising three layers, namely a core layer 223 having an index of refraction of $n_{WG}$, two adjacent layers both having indices of refraction $n_{mat/WG}$ and the layer of low-index refraction matter 210 having indices of refraction $n_{Matrix}$. All three layers have indices of refraction which are higher than $n_{air}$. Thus the thickness $d_{eff\text{-}WG}$ of effective VE waveguiding layer 221 equals c+t. Typically the distance $d_{air\text{-}WG}$ from the air-matrix interface 211 to VE waveguiding layer 221 is much larger than the effective thickness $d_{eff\text{-}WG}$ of VE waveguiding layer 221.

Figure 3:
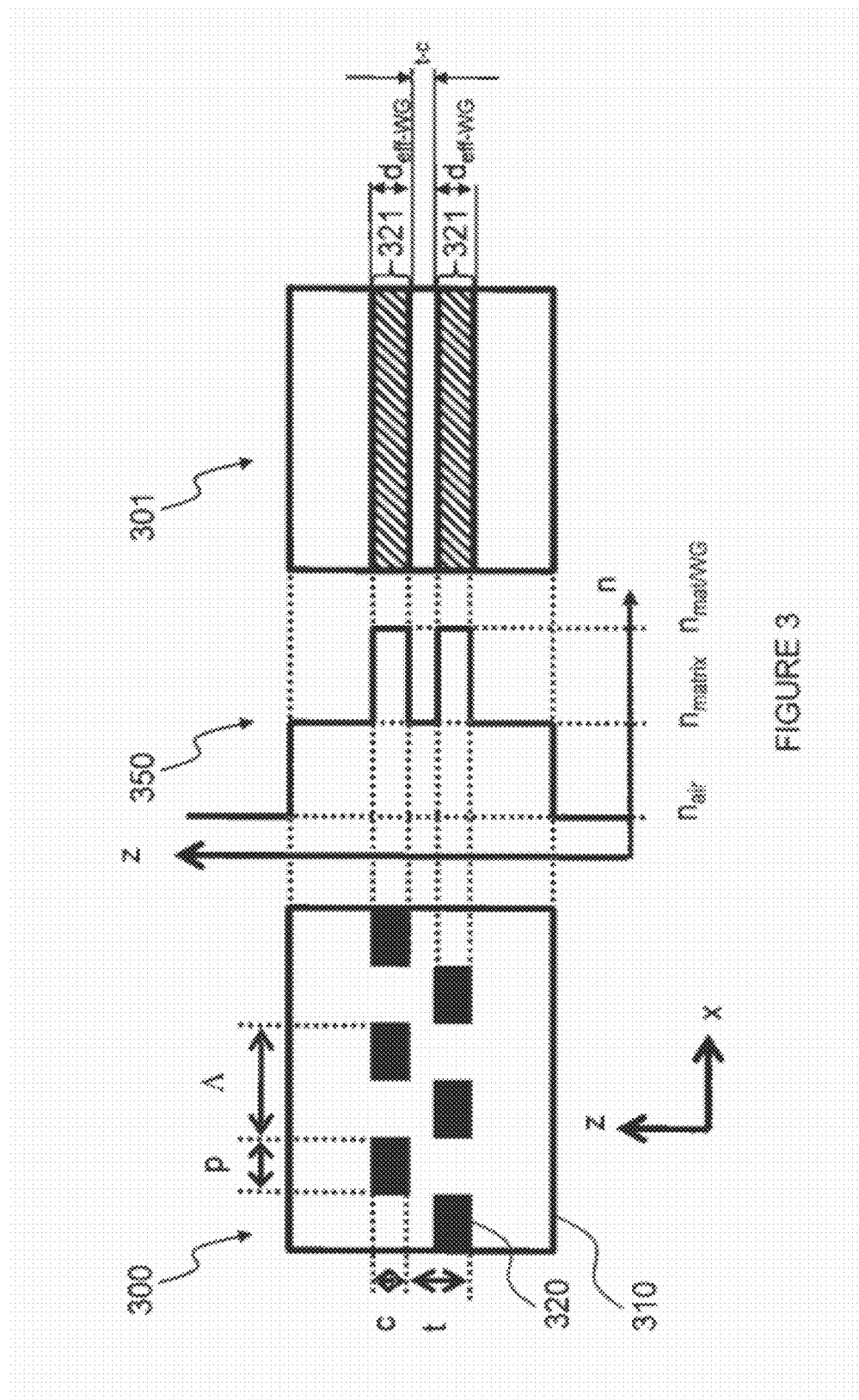
FIG. 3 is a schematic side view illustration of a third ZOF as known in the art, of the corresponding index of refraction profile in Z-direction, and of the corresponding VE multilayer design assuming homogeneous layers in the X-Y-plane with the respective averaged indices of refraction.

Making further reference to FIG. 3, a side view of a third ZOF 300 that is free of a holohedral waveguide core is schematically illustrated. In contrast to second ZOF 200, thickness c of high-index refraction material 320 has to be lower compared to the grating depth t. As a result, third ZOF 300 implements a VE multilayer design that includes an upper and a lower VE waveguiding layer 321 separated from one another and each having a thickness c and an index of refraction $n_{mat/WG}$.

The thickness $d_{eff\text{-}WG}$ of each VE waveguiding layer 321 is c, and they are separated by an interlayer of 324 having thickness t−c. Typically thicknesses t and c may be of the same order. Light guided in upper VE waveguiding layer 321 interacts with light guided in lower VE waveguiding layer 321.

Figure 4:
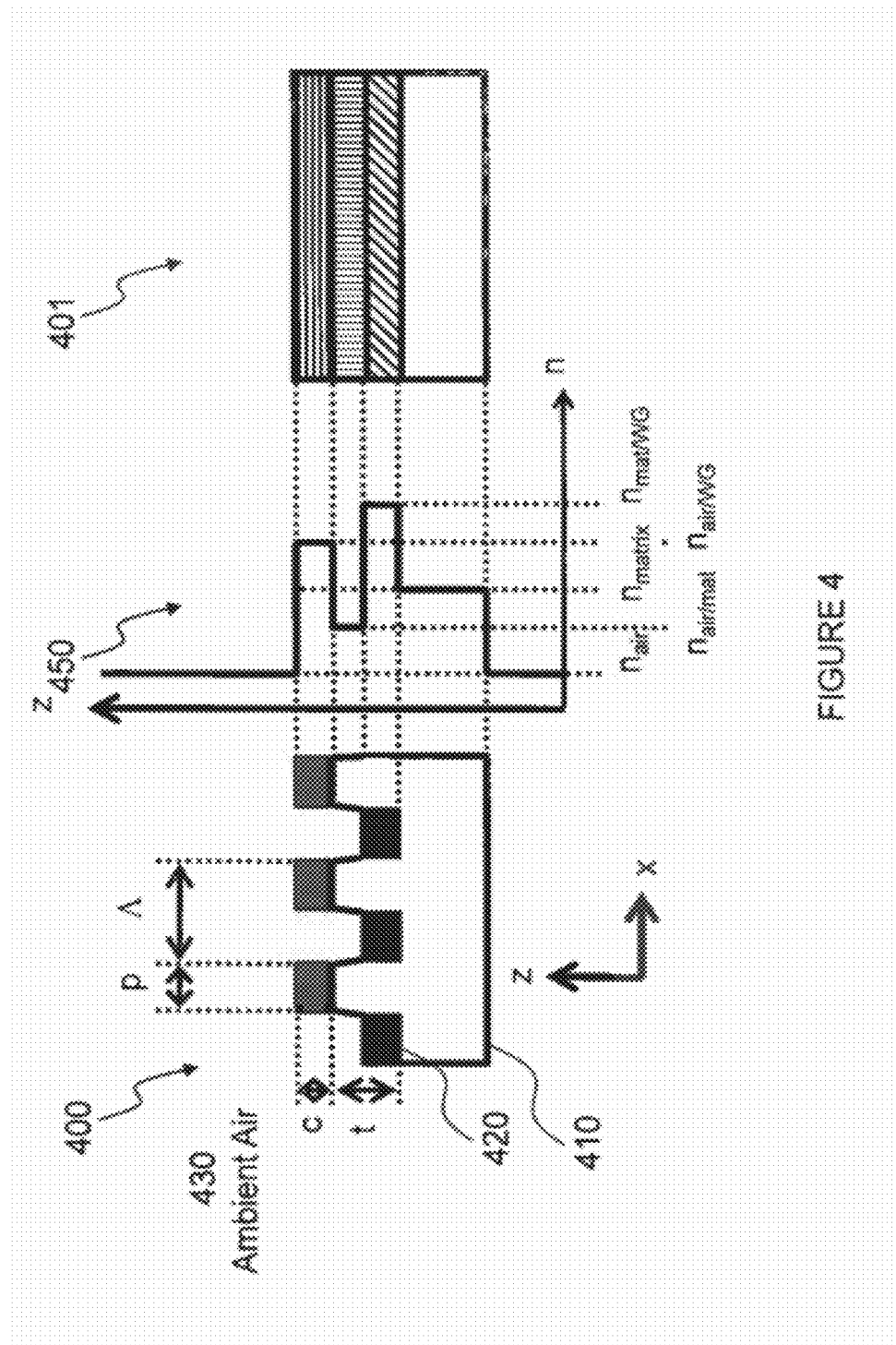
FIG. 4 is a schematic side view illustration of a fourth ZOF as known in the art, of the corresponding index of refraction profile in Z-direction, and of the corresponding VE multilayer design assuming homogeneous layers in the X-Y-plane with the respective averaged indices of refraction.

Additionally referring now to FIG. 4, the design of a fourth ZOF 400 is analogous to the design of third ZOF 300, with the difference that fourth ZOF 400 is free of the top layer of low-index refraction matter 410. Thus, high-index refraction material 420 interfaces with ambient air 430. Index of refraction profile 450 of fourth ZOF 400 schematically illustrates a step like increase from $n_{air}$ to $n_{air/WG}$ followed by a decrease to $n_{air/mat}$. Other than that, the index of refraction profile 450 is the same as the index of refraction profile 350 schematically illustrated in FIG. 3. Accordingly, VE fourth ZOF 401 is similar to VE third ZOF 301.

Figure 5:
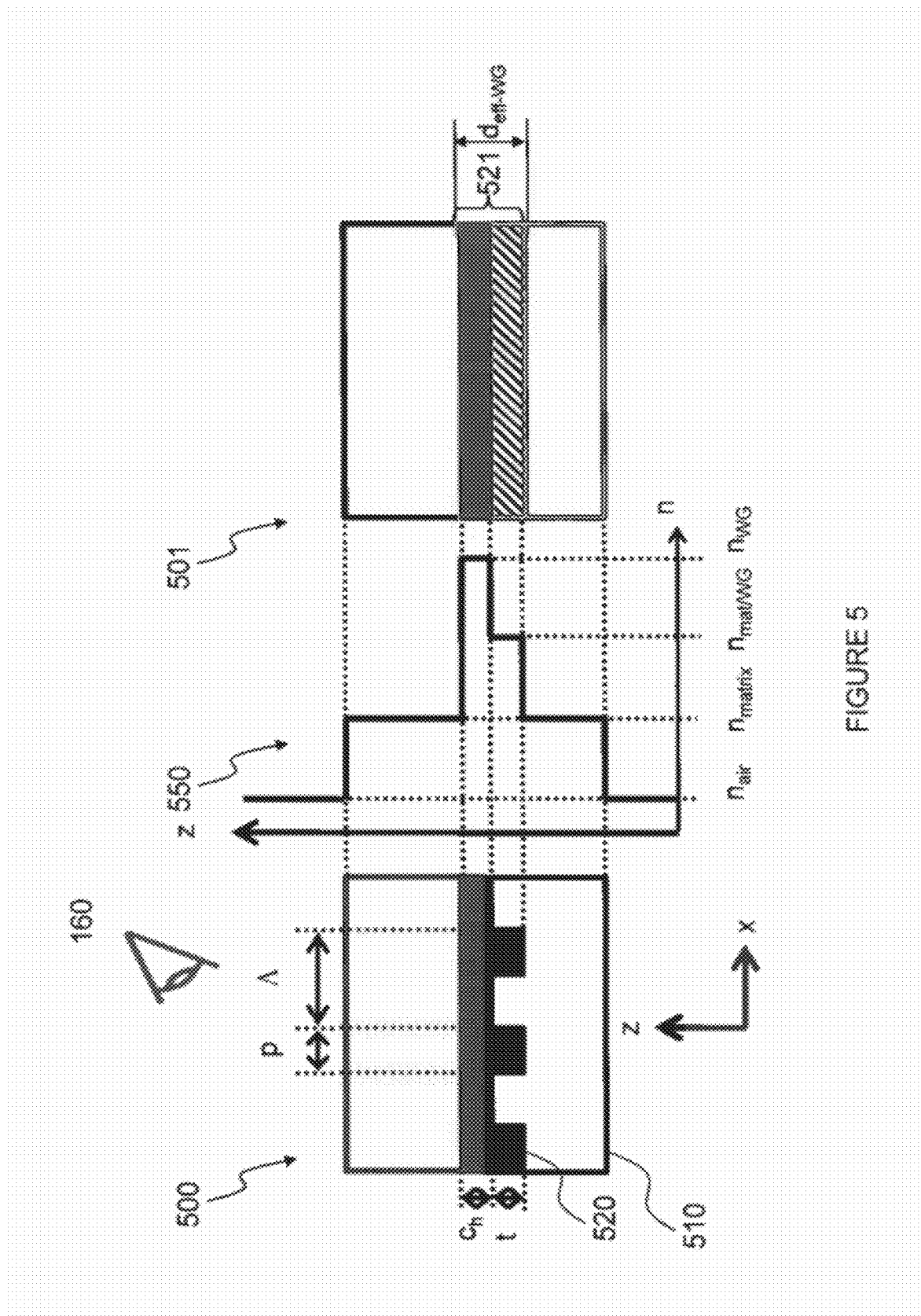
FIG. 5 is a schematic side view illustration of a fifth ZOF as known in the art, of the corresponding index of refraction profile in Z-direction, and of the corresponding VE multilayer design assuming homogeneous layers in the X-Y-plane with the respective averaged indices of refraction.

Further reference is made to FIG. 5. A fifth ZOF 500 as known in the art comprises a high-index refraction material 520 that is one-sidedly grated with a lower diffraction grating 525, whereas the upper side of high-index refraction material 520 with respect to a viewing direction 160 is flat. This is in distinct contrast to the ZOFs schematically illustrated in the FIGS. 1-4, wherein the high-refraction refraction material is two-sidedly grated.

Fifth ZOF 500 exhibits an asymmetric index of refraction profile. Fifth ZOF 500 can be realised e.g. by embossing, diffraction grating 525 into low-index refraction matter 510 followed by providing high-index refraction material 520 by wet coating. Two examples of such wet coatings are gravure printing of formulations with high-index polymers like Optimate HR751 or with nitrocellulose mixed with $TiO_2$ nanoparticles. Finally, a top layer of low-index refraction matter 510 with $n_{low}$ is provided onto high-index refraction material 520. The design of fifth ZOF 500 results in a VE waveguiding layer 521 having a thickness $d_{eff\text{-}WG}$ that equals is c+t. The mass thickness c of VE waveguiding layer 521 equals the thickness $c_h$ of the holohedral part of high-index refraction material 520 plus grating depth t weighted by the fill factor, as is outlined in the equation below:

$$c = c_h + f\!f \times t \quad (2)$$

Reference is now made to FIG. 6. A sixth ZOF 600 features a design that is mirrored with respect to fifth ZOF 500. Accordingly, sixth ZOF 600 is free of a lower virtual equivalent (VE) layer having an index of refraction $n_{mat/WG}$. Sixth ZOF 600 can be realised e.g. first by wet coating a flat substrate 610 with an embossable high-index refraction material 620, where after coating, the diffraction grating 625 is embossed.

Additional reference is now made to FIG. 7. A seventh ZOF 700 as known in the art employs diffraction gratings 725 having a different cross-sectional grating profile, namely a corrugated profile. Other possible profiles of diffraction gratings 725 include sinusoidal or triangular profiles. In diffraction grating 725: c>t. The index of refraction profile shows gradient variations due to the rounded grating lines of diffraction grating 725. The index of refraction of holohedral core of high-index refraction material 720 is denoted $n_{WG}$.

Reference is now made to FIGS. 8A, 8B and 8C schematically showing different planar grating profiles. Hitherto, ZOFs that are based on diffraction gratings having linear grating lines (FIG. 8A) with respect to their top view, which shows the x-y plane, have been discussed. Top views of other types of grating structures are schematically illustrated in FIG. 8B and FIG. 8C. More specifically, FIG. 8B schematically illustrates a top view of a crossed grating structure of a chessboard-like type, and FIG. 8C schematically illustrates a top view of a hexagonal dot grating structure. Parameters p, $p_x$ and $p_y$, denote the structure size of high-index refraction material 820. $\Lambda$, $\Lambda_x$ and $\Lambda_y$ are the periods of these microstructures in the x-y-plane.

Patent document EP1560884 teaches a pigment, the smallest size of which corresponds at least to a multiple of the greatest wavelength of ultraviolet light or the smallest wavelength of visible light. Said pigment comprises at least one defined diffractive structure, the spatial periodicity of which has a spatial period corresponding at least to a multiple of the wavelength of ultraviolet light. In particular, the inventive pigment has a laminar shape. The method for producing such pigments comprises the following steps; a) a defined diffractive structure is created in and/or on a film-type support; b) the defined diffractive structure is coated with a sealant on said support; c) the film-type support processed in steps a) and b) is comminuted so as to form pigment particles. The described pigments have a period of at least several times 400 nm, which means at least 2×400 nm=800 nm. The pigments may have holographic, diffractive microstructures with different orientations of the microstructures. The holographic, diffractive microstructures can even be rotational symmetric. The goal is to realise isotropic first or higher order diffraction in a coating comprising such pigments in a not aligned manner.

U.S. Pat. No. 4,484,797 teaches a variable index-of-refraction optical medium of certain minimum thickness and periodicity with respect to the wavelength of incident light-if it meets certain specified constraints with respect to (1) relative indices-of-refraction of both its internal structure and that of its surroundings and (2) relative values of incident wavelength to periodicity and the relative indices-of-refraction-operates to produce both angularly-dependent subtractive-colour filter reflection spectra and subtractive-colour filter transmission spectra in accordance with its physical parameters. Such filters are suitable for use as authenticating devices for sheet-material authenticated items. They exhibit visible colour effects upon rotating the devices.

Patent document WO2004/077468 teaches a grid structure used for protecting valuable articles through the realization of colour images. The inventive structure consist of at least a first part provided with a grid constant which is less than a wavelength at which said part is observable and embodied in the form of a relief structure whose relief height is defined in such a way that the zero-order grid image can be observed in a determined spectral range. Said part has a size less than 0.5 mm at least in one direction. Preferably, this part has the shape of a line. The optical of the parts of the grid image is tuned by adjusting the grating depth.

EP0105099 teaches a document that includes a substrate which has an outer surface and defines a plane, and a coordinate system which is defined pith respect to the plane. A diffraction-optical authenticating element covers at least part of the outer surface, and generates at least one colour pattern constituting a visually testable feature which verifies the authenticity of the document. The diffraction-optical authenticating element provides a colour pattern moving at a predetermined velocity along a predetermined track when the document is illuminated from a first direction and viewed from a second direction, as defined with respect to the coordinate system, upon the document being rotated within the plane along a prearranged sense of rotation, and at a prearranged velocity. The period of the diffraction-optical authenticating element is in the range of 700 nm to 2200 nm. The colour effect is based on first or higher order diffraction.

Patent document EP1990661 teaches an isotropic zero-order diffractive colour filter, a method to manufacture an embossing tool and a method to manufacture such a filter. The zero-order diffractive colour filter comprises diffractive microstructures and a waveguiding layer, wherein the diffractive microstructures possess a short range ordering over at least four times the period of the microstructures, and the diffractive microstructures possess a long range disordering over length scales of more than 100 μm.

DESCRIPTION OF THE INVENTION

It should be noted that the term "isotropic colour effect" of an isotropic optical filter according to an embodiment of the invention, as used herein, refers to a colour effect that remains unchanged or which is weak for the same tilting orientation, irrespective of the rotational orientation φ of the isotropic optical filter relative to a viewing direction Θ. In other words, the colour effect exhibited by the isotropic optical filter is substantially insensitive to the rotational incidence angle φ, whereas the same isotropic optical filter exhibits a characteristic colour effect for different tilting orientations, i.e., a change in angle Θ causes a change in the characteristic colour effect.

To simplify the discussion that follows, the term "viewing direction" as used herein refers to an optical axis defined with respect to world coordinates. Accordingly, the terms "tilting", "tilting orientation", "rotating" and "rotational orientation" relate to a change in orientation of the isotropic optical filter relative to said viewing direction; and/or vice versa, i.e., to a rotational and/or tilting change in orientation of the viewing direction relative to the isotropic optical filter.

It should be noted the meaning of the phrase "weak colour effect" of an isotropic optical filter that is based on a zero-order diffractive filter (ZOF), as well as grammatical variations thereof, should be interpreted with respect to the characteristic colour effect obtainable by the ZOF upon tilting. Otherwise stated, the rotational colour effect of the ZOF is weak (e.g., hardly recognizable by the human eye) compared to the characteristic colour effect the ZOF exhibits upon tilting.

The term "characteristic colour effect" refers to a spectral curve in transmission and/or reflection purposely effected by a specific design of an isotropic optical filter according to an embodiment of the invention. Examples of a characteristic colour effect or effects may include, for example, characteristic reflection peaks in the visible and/or near infra red spectral region. For example, in an embodiment wherein the period of the diffractive microstructures is larger, e.g. between 500 and 700 nm, NIR radiation is reflected by the isotropic optical filter. Depending on the tilting angle the reflection peak moves from about 700 nm to 900 nm. Such an isotropic optical filter microstructure can be used as a heat-reflecting pane. Further, a reflection peak in the visible spectral range can for example be a measure for a colour observable by the human eye.

It should be noted that positional terms such as "right", "left", "top", "bottom", "upper" as used herein do not necessarily indicate that, for example, a "lower" component is below an "upper" component as such directions, components or both may be flipped, rotated, moved in space, placed in a diagonal orientation or position, placed horizontally or vertically, or similarly modified. Accordingly, it will be appreciated that terms such as, for example, "right", "left", "top", "bottom", "upper, lower" may be used herein for exemplary purposes only, to illustrate the relative positioning or placement of certain components, to indicate a first and a second component or to do both.

It should be understood that an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any, suitable combination. Accordingly, the various embodiments, preferences and ranges as provided and/or disclosed herein may be combined at will. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions.

It should be understood that the phraseology and terminology employed herein is not to be construed as limiting and is for descriptive purpose only.

It should be understood that the details get forth herein do not construe a limitation to an application of the invention. Furthermore, it should be understood that the invention can be carried out or practiced in various ways and that the same invention can be implemented in embodiments other than the ones outlined in the description below.

It should be understood that the terms "including", "comprising", "consisting" and grammatical variants thereof do not preclude the addition of one or more components, features, steps, integers or groups thereof.

The term "based on" is not exclusive and provides for eventually being based on additional factors not described, unless otherwise indicated.

If the specification or claims refer to "an additional" element, that does not preclude there being more than one of the additional element.

It should be understood that where the claims or specification refer to "a" or "an" element such reference is not to be construed as there being only one of that element.

SUMMARY OF THE INVENTION

The present invention discloses an isotropic optical filter comprising high-index refraction material positioned between low-index-refraction matter. At least some of the high-index refraction material has a grated structure and lateral and vertical dimensions with respect to the low-index-refraction matter such that the high-index refraction material is operative to act as a leaky waveguide for light incident on the ZOF.

According to an embodiment of the invention, the grated structure comprises at least two different grating patterns. Each of said at least two grating patterns constitutes a subpixel. A plurality of subpixels is operative to diffract incident light to at least two zero-order wavelength spectra respective of the at least two grating patterns such to exhibit an isotropic colour effect with respect to the rotational orientation of the isotropic optical filter relative an observer.

According to an embodiment of the invention, the plurality of subpixels constitute an isotropic pixel.

According to an embodiment of the invention, the at least two grating patterns may be defined according to their different planar grating orientations.

According to an embodiment of the invention, the at least two grating patterns may respectively comprise different periods Λ of a diffractive microstructure.

According to an embodiment of the invention, the plurality of subpixels have a lateral dimension of, e.g., ≤250 µm.

According to an embodiment of the invention, the plurality of subpixels may have a lateral dimension of, e.g., ≤80 µm.

According to an embodiment of the invention, the grated structure may have at least one of the following structures: a linear grating structure, a chessboard-like structure, and a dotted structure.

According to an embodiment of the invention, the plurality of subpixels may be arranged in a matrix layout.

According to an embodiment of the invention, the plurality of subpixels may have at least approximately one of the following shapes: curved, circular, and polytonal. Accordingly, the planar shape of a subpixel may be arbitrary.

According to an embodiment of the invention, the plurality of subpixels may comprise at least one sub pixel that includes a high-index refraction material that is free of microstructured grating, in addition to the at least two grating patterns.

According to an embodiment of the invention, the lateral distance $d_{gap}$ between neighbouring subpixels may be, for example, ≤5 µm.

According to an embodiment of the invention, the difference in height between two neighbouring subpixels may be, for example, ≤0.2 µm.

The present invention further discloses a method for manufacturing an isotropic optical filter. According to an embodiment of the invention, the method includes the employment of at least one of the following process: embossing, and replication.

According to an embodiment of the invention, the replication process may comprise at least one of the following processes: ultraviolet-replication processes, and a hot-embossing process.

DETAILED DESCRIPTION OF THE INVENTION

It is the object of the invention to teach an alternative optical filter, exhibiting for light impinging thereon, isotropic colour effects upon rotation and characteristic colour effects upon tilting, according to embodiments of the invention. Such isotropic optical filter may be employed, for example, in security applications. The isotropic colour effects as well as the characteristic colour effects are based on zero-order diffraction, and may be easily identifiable, e.g., by an observer or detector.

According to an embodiment of the invention, the alternative optical filter is hereinafter referred to as "isotropic optical filter", and includes at least one isotropic pixel. Each isotropic pixel comprises at least two grating patterns $P_n$ of a diffractive microstructure defining a plurality of subpixels. Accordingly, an isotropic optical filter according to embodiments of the invention includes a group of subpixels comprising at least two different grating patterns operative to respectively diffract a corresponding zero-order wavelength spectra. The at least one isotropic pixel exhibits the isotropic colour effect upon rotation and characteristic colour effects upon tilting.

The isotropic pixels have a function similar to the one of unit-cells known from crystals. It should be noted that the term "subpixel" and "unit-cell" can be used interchangeably.

In some embodiments of the invention, the isotropic optical filter includes a plurality of isotropic pixels. More specifically, the subpixels are arranged with respect to each other such to form an arrangement of isotropic pixels which are laterally arranged with respect to each other in an array. Each of these isotropic pixels may have at least one design feature in common.

According to some embodiments, the at least two grating patterns $P_n$ are laterally bounded. More specifically, the at least two grating patterns $P_n$ are operative to respectively diffract a zero-order wavelength spectra or colour $C_i$. The characteristic colour effect respect of a grating pattern $P_i$ of one subpixel is hereinafter referred to as "elemental characteristic colour effect". The at least two grating pattern $P_n$ are arranged such that the isotropic optical filter exhibits isotropic colour effects upon rotation, and characteristic colour effects upon tilting.

In a further embodiment the subpixels are arranged in a random manner but such as to form an isotropic filter according to this invention, or in other words, such that an overall isotropic colour effect is achieved with this random subpixel arrangement. In some embodiments, an isotropic optical filter based on that random subpixel arrangement may for example comprise four different types of subpixels, wherein the number of all four subpixels types in the isotropic optical filter is approximately equal.

It should be noted that term "grating pattern" as used herein can refer to the orientation of a grating structure in the X-Y plane (planar grating orientation, herein indicated as "α"), and/or to the type of grating of the diffractive microstructure in the X-Y plane (planar grating profile) and/or to the type of grating of the diffractive microstructure in the X-Z plane (cross-sectional grating profile). Each of the at least two grating patterns $P_n$ is designed such to exhibit a respective characteristic colour effect, wherein the at least two grating patterns $P_n$, are designed such to exhibit in combination an isotropic colour effect, i.e., at least approximately identical resonance conditions are obtained for each of the plurality of different lateral orientations for any rotational orientation.

Accordingly, a grating pattern $P_i$ may be defined in respective embodiments of the invention by at least one of the following parameters: planar grating orientation, planar grating profile, the cross-sectional grating profile, and the geometric shape of the boundaries of the isotropic pixels and/or subpixels. A subpixel of the plurality of subpixels may be of at least approximately one of the following shapes: triangular, quadratic, rectangular, hexagonal, rhombus or any other suitable shape. Accordingly, a subpixel may be of a generally polygonal shape.

As already indicated hereinabove, the cross-sectional grating profile depends on at least one of the following parameters: grating period, grating depth, fill factor. Additional or alternative parameters may influence the characteristic colour effects of the isotropic optical filter such as, for example, the index of refraction of the high-index refraction material and of the low-index refraction matter, the effective thickness of the high-index refraction material and the resulting effective equivalent thickness of the low-index refraction matter.

In some embodiments, the isotropic optical filter includes at least two grating patterns $P_n$ that are located in adjacency to one another. The at least two grating patterns $P_n$ differ from one another, for example, with respect to their planar grating orientation. The parameters of the at least two different grating patterns $P_n$, are designed such to respectively diffract zero-order wavelength spectra or colours $C_i$ in a manner such that at least some of the respectively diffracted zero-order wavelength spectra or colours $C_i$ are combined to exhibit an isotropic colour effect $C_{isotropic}$. In other words, the combined isotropic optical colour effect $C_{isotropic}$ exhibits a non-observable change in colour upon rotation, but a characteristic colour effect upon tilting with respect to a viewing direction. Therefore, the combination or mixture of elemental characteristic colour effects respective of the at least two different grating patterns $P_n$ defines the overall optical characteristics of the isotropic optical filter.

It should be noted that in embodiments wherein at least two different grating patterns $P_n$ are employed, the respectively diffracted at least two zero-order wavelength spectra $C_i$ may in respective embodiments have spectra in common or not in common.

The at least two grating patterns $P_n$ may differ from one another in at least one of the following parameters: in the planar grating orientation, in the grating period, and the grating depth. The grating depths of the at least two grating patterns $P_n$ may differ from one another by, for example, less than 50 nm, or less than 30 nm.

According to an embodiment of the invention, each of the least two grating patterns $P_n$ are laterally bounded such to respectively constitute subpixels of an isotropic pixel. Otherwise stated, an isotropic optical filter includes according to an embodiment of the invention, in the X-Y plane, a plurality of subpixels, i.e., the isotropic optical filter is divided in the X-Y plane into a plurality of subpixels. Each of the plurality of subpixels includes a selected one of the at least two different grating patterns $P_n$. In some embodiments of the invention, the plurality of subpixels may be arranged according to an m×n matrix.

Additionally or alternatively, isotropic optical filters according to embodiments of the invention are operative to realise different characteristic colour effects depending on the tilting angle of the isotropic optical filter with respect to a viewing direction. For example; isotropic optical filters according to embodiments of the invention may, depending on the tilting angle, selectively show and not show symbols.

According to some embodiments of the invention, the plurality of subpixels comprises at least one subpixel that includes high-index refraction material that is free of microstructured grating, in addition to the subpixels that comprise at least two grating patterns $P_n$. It should be noted that the cross-sectional structure and planar structure of the isotropic optical filters according to embodiments of the invention exemplified in the accompanying figures are for exemplary purposes only and should by no means to be construed as limiting. Accordingly, the planar grating orientation and/or cross-sectional grating profile and/or planar grating profile and/or the geometric shape of the boundary(ies) of a diffractive microstructure and/or a cross-sectional structure of a isotropic optical filter is not limited to what is schematically illustrated and described, and may thus include and/or have additional or alternative structures.

It should be noted that the geometric shapes of the subpixels as described and schematically illustrated herein with reference to the accompanying figures should not be construed as limiting. Accordingly, subpixels according to embodiments of the invention may therefore be of any, geometric shape and have areas of various magnitudes.

According to some embodiments of the invention, an isotropic optical filter arrangement may include a plurality of subpixels comprising at least two grating patterns $P_n$ which may be arranged on a substrate in a manner such to generate a halftone image exhibiting isotropic colour effects.

According to some embodiments of the invention, the isotropic optical filter may be employed as diffractive colour effect pigments. In one embodiment, such pigments include at least one isotropic pixel.

Further, an isotropic optical filter that includes a plurality of isotropic pixels is disclosed.

The present invention further teaches a method of manufacturing an isotropic optical filter according to embodiments of the invention.

According to embodiments of the invention, the characteristic colour effects are in respective embodiments of the invention static or animated. Thus, isotropic optical filters can be employed as security and/or authentication devices by providing an item to be protected from counterfeiting with such an isotropic optical filter. Such an item may include, for example, payment means like, e.g., banknotes, credit cards and cheques; personalized identification documents like, e.g., passports, visas, driver licences, identification cards; brand name products; packaging like, e.g., blister packaging, and the like.

It should be noted however, that an isotropic optical filters according to embodiments of the invention may include additional and alternative applications. For example, isotropic optical filters may be employed in the field to telecommunication, for example, as multiplexing or de-multiplexing devices.

According to some embodiments of the invention, an isotropic optical filter is operative to reflect light in the near infrared spectral range (NIR) while transmitting light with wavelengths outside the NIR such as, for example, in the visible range. The isotropic optical filter can thus be used in solar-control or heat-reflection applications like, e.g., as heat reflecting pigments for windows of buildings.

According to embodiments of the invention, the plurality of subpixels includes high-index refraction material that is disposed between lower and upper low-index refraction matter. At least two of the plurality of subpixels includes high-index refraction material that is at least partially microstructured.

According to an embodiment of the invention, the difference in the index of refraction of high-index refraction material compared to the index of refraction of adjacent low-index refraction matter is, for example, $\geq 0.1$, $\geq 0.2$, $\geq 0.3$, $\geq 0.4$, or $\geq 0.5$, in other words, $n_{high}-n_{low} \geq 0.1$, $n_{high}-n_{low} \geq 0.2$, $n_{high}-n_{low} \geq 0.3$, $n_{high}-n_{low} \geq 0.4$ or $n_{high}-n_{low} \geq 0.5$. The difference in the index of refraction between the high-index refraction material and the low-index refraction matter holds in the spectral range for which the zero-order diffractive filter is designed. Further, the value of $n_{high}-n_{low}$ may be equal or below 2.

High-index refraction material may be made of any suitable material including, for example, $ZnS$, $TiO_2$, $Cr_2O_3$, $AlN$, $Al_2O_3$, $Ta_2O_5$, $ZrO_2$ or any combination of the aforementioned materials.

The diffractive microstructure is structured such to be operative to couple at least some of the light incident thereon into the high-index refraction material. The high-index refraction material may thus sometimes be referred to as "waveguiding layer". More specifically, depending on the angle and rotational orientation of incident light with respect to the diffractive microstructure and depending on the parameters of the waveguiding structures, corresponding wavelength spectra of the incident light may be coupled in the waveguiding layer. Suitable ranges of the parameters of diffractive microstructures are exemplified herein below in TABLE 1:

TABLE 1

| Parameter of the periodic zero-order diffractive microstructures and of the waveguiding layer | First option | Second option | Third options |
| --- | --- | --- | --- |
| Period $\Lambda, \Lambda_x, \Lambda_y$ | 100 nm-3000 nm | 200 nm-650 nm | 250 nm-500 nm |
| Depth t | 50 nm-600 nm | 80 nm-450 nm | 80 nm-300 nm |
| Fill factor ff | 0.1-0.9 | 0.25-0.75 | 0.35-0.65 |
| $\Delta n = n_{wg} - n_{low}$ | $\geq 0.1$ | $\geq 0.2$ | $\geq 0.4$ |
| Mass thickness c of high-index refraction material | 30 nm-1000 nm | 50 nm-500 nm | 80 nm-300 nm |
| Effective thickness $d_{eff-WG}$ of the wave-guiding layer | 30 nm-1000 nm | 50 nm-500 nm | 80 nm-300 nm |

The effective thickness $d_{eff-WG}$ refers to the virtual equivalent thickness of the layer effectively or actually acting as the waveguiding layer in the isotropic optical filter. Accordingly, this virtual equivalent thickness may be of different size from the actual maximal mass thickness c of the high-index refraction material employed.

The isotropic optical filter according to embodiments of the invention exhibits a short range ordering due to the periodic configuration of the diffractive microstructures. Due to the regular arrangement of the subpixels and the isotropic pixels, the isotropic optical filters according to embodiments of the invention possess a long range ordering, too. In other words, isotropic optical filters according to embodiments of the invention feature periodicity or regularity with respect to the subpixels and isotropic pixel included.

According to an embodiment of the invention, the lateral dimension of an isotropic pixel is below the resolution limit of the human eye. For example the lateral dimension of an isotropic pixel may be, e.g., $\leq 0.5$ mm, $\leq 160$ μm, or $\leq 100$ μm.

The lateral dimensions of a subpixel according to an embodiment of the invention may be, for example, $\leq 250$ μm, $\leq 150$ μm, or $\leq 80$ μm.

According to an embodiment of the invention, the diffractive microstructures of the grating patterns possess the lateral orientations $\alpha_n$, wherein the at least two grating patterns $P_n$ comprise diffractive microstructures having a plurality of different lateral orientations. Accordingly, an isotropic pixel comprising, for example, three subpixels, includes at least two different grating patterns $P_n$.

In some embodiments of the invention, each subpixel of an isotropic pixel may have a grating pattern with different planar grating orientation relative to each other. Accordingly, $$\alpha_i \neq \alpha_j, \text{ for}$$

$$i \neq j \qquad (3)$$

Generally, the higher the number of subpixels in the isotropic pixel having different planar grating orientations, the higher is the degree of isotropy of the optical effect that may be exhibited by the isotropic pixel. On the other hand, the more subpixels an isotropic pixel of an isotropic optical filter includes, the larger the planar dimensions of the isotropic pixel become. As a result thereof, some of the isotropic pixels may be easier resolved by the human eye, which in turn may reduce the observed effect of optical isotropy. Thus, the number of subpixels and the size of the isotropic pixels have to be optimized such to increase the isotropy of the colour effect whilst not causing the subpixels to become resolvable by the human eye, for example.

In some embodiments of the invention, the differences in planar grating orientation $\alpha_i$ between mathematically successive grating patterns of an isotropic pixel may be constant, i.e., the steps between mathematically successive angles $\alpha_n$ of the at least two grating patterns $P_n$, may be equal. Alternatively, the differences in the planar grating orientation $\alpha$ may be non-equal or in other words, the steps between mathematically successive angles $\alpha_n$ may be non-equal, and may be chosen randomly. It should be noted that the employment of subpixels with different planar grating orientation in an isotropic pixel avoids the generation of Moiré like or sparkling optical effects.

According to some embodiments of the invention, the at least two grating patterns $P_n$ are diffractive microstructures of different periods $\Lambda$. More specifically, the period $\Lambda$ respective of at least two grating patterns $P_n$ may be designed such that the corresponding isotropic pixel reflects at least approximately a selected odour (e.g. green) for all rotational orientations the isotropic optical filter. In embodiments, such at least two grating patterns $P_n$ may have at least approximately identical planar grating orientations, i.e., they may be at least approximately parallel to each other.

According to an embodiment of the invention, an isotropic optical filter may be shaped such that the diffractive microstructures thereof cover an area at least approximately 100% of the isotropic optical filter.

In some embodiments, subpixels may include a hidden security features (HSF). Such HSFs may for example be embodied by at least one of the following: microtext, microstructures (e.g., scattering microstructures) and nanostructures. Such HSFs may be designed such to be readable by employing forensic verification devices and/or methods. Examples of such forensic verification devices include atomic force microscopes (AFM), scanning electron microscopes (SEM), and transmission electron microscopes (TEM). Examples of forensic verification methods include laser scattering analysis; and X-ray scattering analysis. As a consequence, such HSFs may for example provide additional security against counterfeiting.

Figures 9A, 9B:
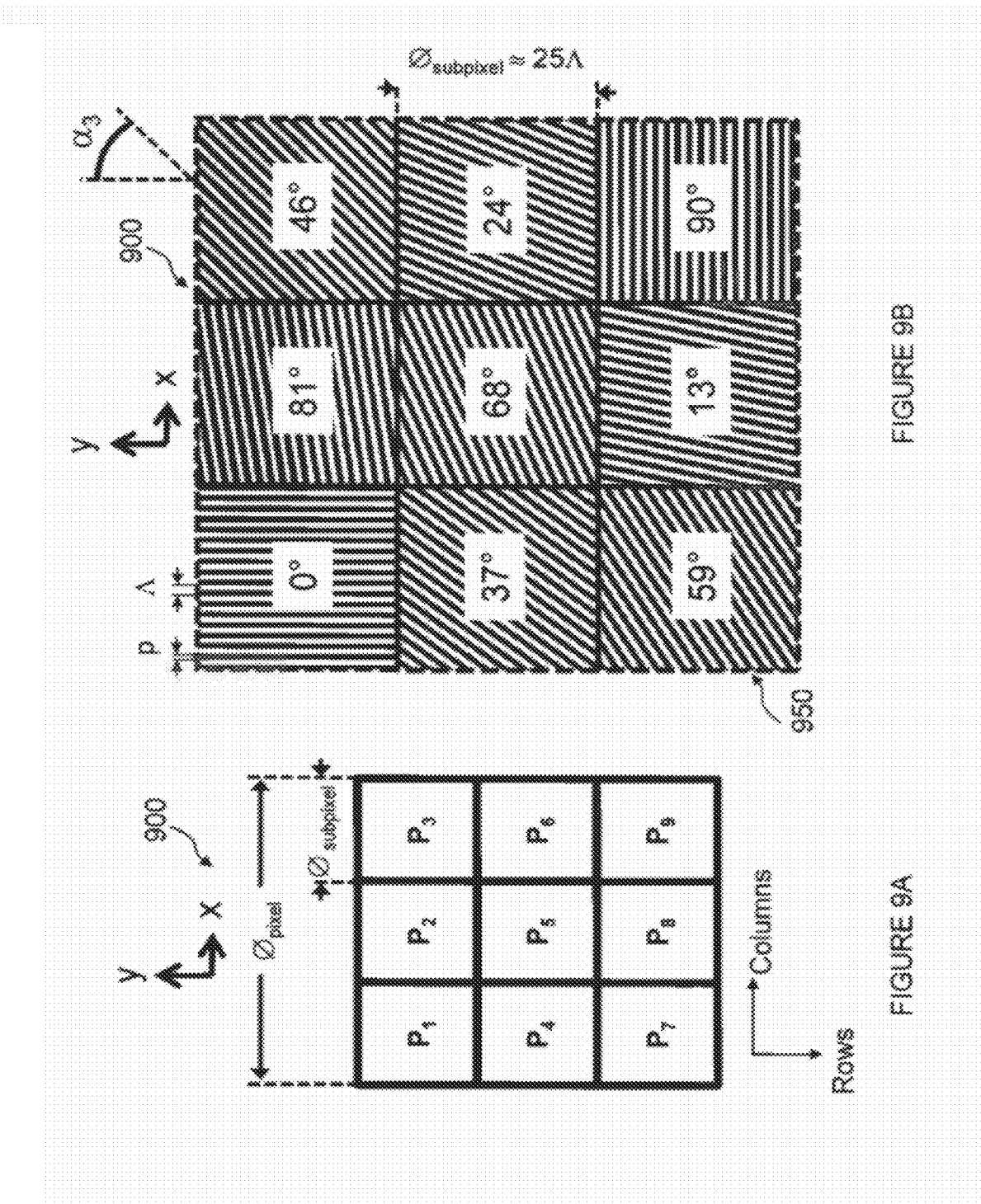
FIG. 9A is a schematic top view illustration of a grating pattern layout in an isotropic pixel, according to an embodiment of the invention.
FIG. 9B is a schematic top view illustration of an isotropic colour pixel, according to the embodiment of FIG. 9A.

Reference is now made to FIGS. 9A and 9B. According to an embodiment an isotropic optical filter 900 may include, for example, nine subpixels 950 arranged, for example, according to a 3×3 matrix, wherein the nine subpixels 950 constitute an isotropic pixel.

With respect to the X-Y plane, subpixels like, e.g., subpixels 950 may be, according to an embodiment of the invention, at least approximately quadratic shaped and may thus have at least approximately identical widths and lengths. Therefore, with respect to FIGS. 9A and 9B, the following equations apply for the isotropic pixel size in the rows $R_i$ and columns $C_i$:

$$\emptyset_{subpixel\ R1} = \emptyset_{subpixel\ R2} = \emptyset_{subpixel\ R3};\ \emptyset_{subpixel\ C1} = \emptyset_{subpixel\ C2} = \emptyset_{subpixel\ C3};\ \text{and}\ \emptyset_{subpixel\ C1} = \emptyset_{subpixel\ R1}.$$

Figure 9C:
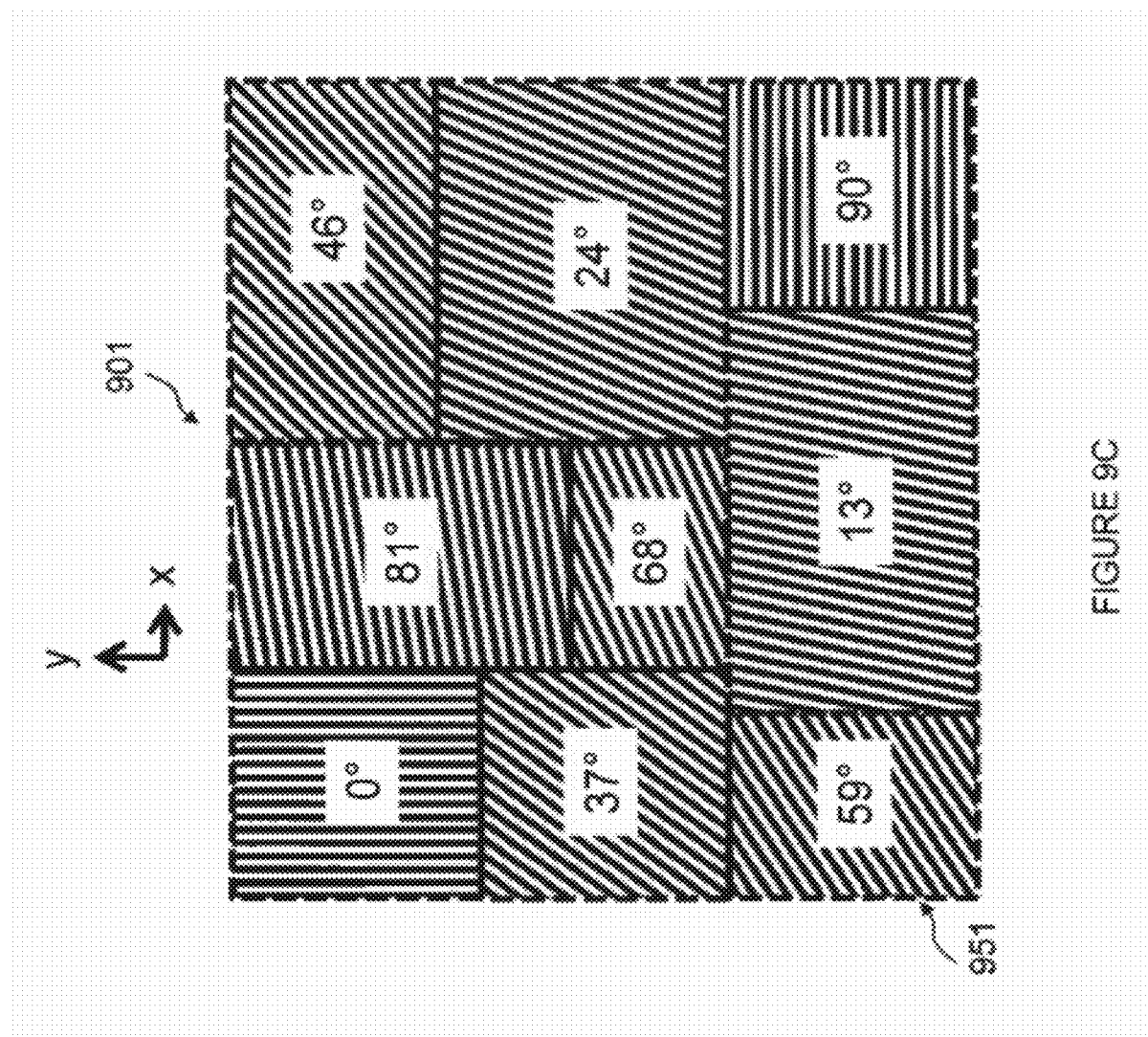
FIG. 9C is a schematic top view illustration of an isotropic colour pixel, according to an alternative embodiment of the invention.

Subpixels 950 exemplified in FIG. 9B have the same size. Of course the subpixels and/or isotropic pixels of an isotropic optical filter according to this invention may have different size and/or shapes. One example of a non-quadratic isotropic pixel 901 comprising subpixels 951 of different size and shapes is schematically shown in FIG. 9C.

Referring now again to FIGS. 9A and 9B, the period of the diffractive microstructures defining the grating pattern is denoted as $\Lambda$ and the bar width as p. According to an embodiment of the invention, the length of the edge of subpixels 950, denoted as $\emptyset_{subpixel}$ may be, for example, at least approximately 25 times the period $\Lambda$.

Isotropic pixel 900 comprises in this example nine different grating patterns $P_n$, which are defined by their difference in the planar grating orientation. In this example the grating period is for all subpixels the same. Of course, other types of isotropic pixels may include a plurality of subpixels comprising diffractive microstructures with at least two different orating periods $\Lambda$. For example, a diffractive microstructure of a first group of subpixels may have a first period $\Lambda$, and a diffractive microstructure of a second group of subpixels may have a second period $\Lambda$.

According to an embodiment of the invention, and as is exemplified with respect to FIG. 9B, respective planar grating orientations $\alpha_n$ may all be non-equal. As an example the grating orientation $\alpha_3$ for P3 is schematically illustrated in FIG. 9B, Isotropic pixel 900 may for an example comprise the following arrangement of grating patterns:

$P_1$: $\alpha_1=0°$ on position (1,1)
$P_2$: $\alpha_2=81°$ on position (1,2)
$P_3$: $\alpha_3=46°$ on position (1,3)
$P_4$: $\alpha_4=37°$ on position (2,1)
$P_5$: $\alpha_5=68°$ on position (2,2)
$P_6$: $\alpha_6=24°$ on position (2,3)
$P_7$: $\alpha_7=59°$ on position (3,1)
$P_8=\alpha_8=13°$ on position (3,2)
and
$P_9$: $\alpha_9=90°$ on position (3,3), Of course, angles $\alpha_1$-$\alpha_9$ may be differently distributed than outlined herein with respect to FIGS. 9A and 9B. Moreover, the planar grating profile may differ from the one exemplified herein in FIG. 9B. Accordingly, the planar grating profile may be, for example, of a hexagonal dot grating type, or of a chessboard-like type.

According to some embodiments of the invention, the planar grating orientation may differ from one another in steps of, e.g., 10°, wherein in subpixel 950 in the upper left corner the planar grating orientation may be vertical ($\alpha_1=0°$), and in subpixel 950 in the lower right corner horizontal ($\alpha_9=90°$). The planar grating orientation in the remainder subpixels 950 may be $\alpha=10°, 20°, \ldots, 70°$. Accordingly, $\alpha_1, \alpha_2, \alpha_3, \alpha_4, \alpha_5, \alpha_6, \alpha_7, \alpha_8$ and $\alpha_9$ may for example be as follows:

$P_1$: $\alpha_1=0°$ on position (1,1)
$P_2$: $\alpha_2=30°$ on position (1,2)
$P_3$: $\alpha_3=20°$ on position (1,3)
$P_4$: $\alpha_4=60°$ on position (2,1)
$P_5$: $\alpha_5=10°$ on position (2,2)
$P_6$: $\alpha_6=40°$ on position (2,3)
$P_7$: $\alpha_7=70°$ on position (3,1)
$P_8=\alpha_8=50°$ on position (3,2) and
$P_9$: $\alpha_9=90°$ on position (3,3), wherein the first index represents the row position and the second index the column position. Isotropic optical filter 900 exhibits a very weak colour effect upon rotation because light is nearly symmetrically diffracted to the viewer.

In some embodiments of the invention, the distribution of the grating orientation in the different isotropic pixels of an isotropic optical filter may be chosen randomly.

According to some embodiment of the invention, the planar grating orientation of the diffractive microstructures may be rotated with respect to each other in steps of 11.25° to further increase symmetry of the light diffracted from isotropic optical filter comprising isotropic pixels 900. Accordingly, isotropic pixel 900 may for example comprise the following arrangement of grating patterns:

$P_1$: $\alpha_1=0°$ on position (1,1)
$P_2$: $\alpha_2=56.25°$ on position (1,2)
$P_3$: $\alpha_3=33.75°$ on position (1,3)
$P_4$: $\alpha_4=67.5°$ on position (2,1)
$P_5$: $\alpha_5=11.25°$ on position (2,2)
$P_6$: $\alpha_6=45°$ on position (2,3)
$P_7$: $\alpha_7=78.25°$ on position (3,1)
$P_8=\alpha_8=22.5°$ on position (3,2)
and
$P_9$: $\alpha_9=90°$ on position (3,3).

Otherwise stated, the steps between mathematically successive angular planar grating orientations may be 11.25°. Accordingly, in some embodiments of the invention, the difference between mathematically successive planar grating orientations $\alpha$ in the planar grating orientations $\alpha_1$-$\alpha_9$ of the respective subpixels 950 may be constant.

Figure 9D:
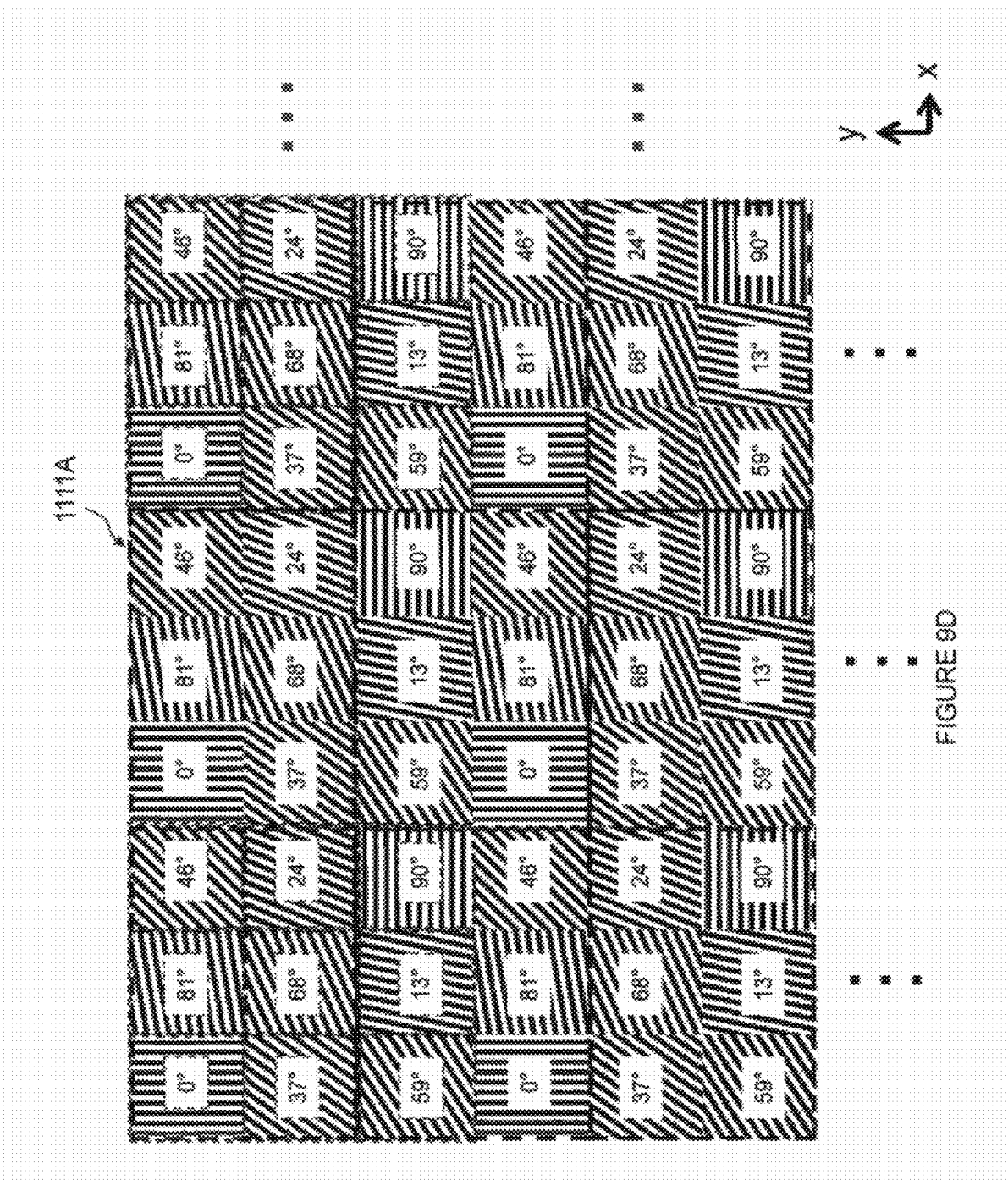
FIG. 9D is a schematic top view illustration of an isotropic colour, filter comprising a plurality of the isotropic pixels of FIG. 9B.

Reference is now made to FIG. 9D, which schematically shows an exemplary detail of an isotropic optical filter 1111A based on isotropic pixel 900 schematically shown in FIG. 9B. An array of 2×3 isotropic pixels 900 is schematically depicted, wherein each isotropic pixel 900 comprises an array of 3×3 subpixels 950 comprising the same number diffractive microstructures with different grating orientations $\alpha_n$. The borders of isotropic pixels 900 are schematically indicated with dashed lines. In this example, even the position of each subpixel 950 with a certain grating orientation—e.g.

$α_i$=37°—within each isotropic pixel 900 is the same. This reoccurring arrangement of grating orientations $α_n$ for each isotropic pixel 900 is an identifiable characteristic feature. Thus, this reoccurring arrangement can be used as a hidden security feature, which can be verified, e.g. by an optical microscope, especially with a differential interference contrast microscope (DIC).

In contrast, FIG. 9E schematically shows an example of an isotropic filter 1111B based on a random arrangement of approximately equal number of different types of subpixels 950. In this example, subpixels 950 with the four different grating orientations 0°, 37°, 59° and 90° constitute isotropic optical filter 1111B. This kind of isotropic optical filter 1111B still has a long range ordering due to its design based on subpixels 950. Nevertheless, subpixels 950 are arranged randomly. The resulting corresponding random arrangement of grating patterns $P_n$ is a characteristic feature of isotropic optical filter 1111B and is thus some sort of fingerprint. Hence, this random arrangement can be used as a hidden security feature, which can be verified, e.g. by an optical microscope, such as a differential interference contrast microscope (DIC). The borders between isotropic pixels 1111B are schematically indicated with dashed lines.

Making reference to FIG. 10, an image 10000, captured by a scanning electron microscope (SEM), depicts a top view of an implementation of an isotropic optical filter 1111C that includes a plurality of isotropic pixels 907, which comprises subpixels 950 of the type schematically shown in FIG. 9A. However, the arrangement of subpixels 950 in isotropic pixels 952 differs from the arrangement in isotropic pixel 900. Three borders of such an isotropic pixel 1111C are schematically illustrated by dashed lines. Furthermore, two identical subpixels 950 are marked as $P_6$.

Additional reference is now made to FIGS. 11A, 11B and 11C. As already outlined herein, isotropic pixels of an isotropic optical filter according to embodiments of the invention may tale different shapes and designs. For example, as is exemplified with respect to FIG. 11A, an isotropic pixel 11001 may include two subpixels 11501 with respective grating patterns, wherein the different planar grating orientations are arranged according to a 1×2 matrix as follows:

$P_1$: $α_1$ on position (1,1)
$P_2$: $α_2$ on position (1,2)

The planar grating orientations of the grating patterns possess the lateral orientations $α_1$ and $α_2 ≈ α_1$. In some embodiments of the invention, the different grating patterns of subpixels 11501 may for example have a difference of half the rotational symmetry angle of the periodic diffractive microstructures. Thus, for linear gratings this difference would be 90°, for crossed gratings (of e.g., chessboard-type) 45°, and for hexagonal gratings 30°.

Reference is now made to FIG. 11B. According to an embodiment of the invention, an isotropic pixel 11002 may include four subpixels 11502, each edge of which having a length denoted as $Ø_{subpixel}$. The length of the edge of pixelated optical filter 11002 is denoted as $Ø_{isotropic\ pixel}$. The grating patterns of the periodic diffractive microstructures defining subpixels 11502 may comprise different planar grating orientations $α_1$ to $α_4$. According to an embodiment of the invention, mathematically successive different planar grating orientations $α_1$ to $α_4$ may equally differ from one another by an angle of, e.g., 30°, and may be arranged, for example, according to a 4×4 matrix as follows:

$P_1$: $α_1$=0° on position (1,1)
$P_2$: $α_2$=30° on position (1,2)
$P_3$: $α_3$=60° on position (2,1)
$P_4$: $α_4$=90° on position (2,2)

According to another embodiment of the invention, mathematically successive different planar grating orientations $α_1$ to $α_4$ may have a non-equal difference between each other and may be arranged, for example, according to a 4×4 matrix as follows:

$P_1$: $α_1$=0° on position (1,1)
$P_2$: $α_2$=25° on position (1,2)
$P_3$: $α_3$=55° on position (2,1)
$P_4$: $α_4$=90° on position (2,2)

As a result of the non-equality in the differences between mathematically successive planar orating orientations, symmetry in the diffraction patterns of the light for isotropic pixel 11502 is further reduced, which may result in increased isotropy of the isotropic colour effect exhibited by isotropic pixel 11502.

Additional reference is now made to FIG. 11C. According to an embodiment of the invention, an isotropic pixel 11003, may include a plurality of subpixels 11503 in a cross-arrangement. With isotropic pixel 11003, an area coverage of the diffractive microstructures of at least approximately 100% can be attained, too.

Further reference is made to FIG. 12A and FIG. 12B. According to an embodiment of the invention, an isotropic pixel may include at least two hexagonally shaped subpixels comprising a plurality of different grating patterns. If the at least two hexagonally shaped subpixels are arranged in adjacency to each other, then the resulting isotropic optical filter may have a hive-like structure with respect to the arrangement of the hexagonally shaped subpixels. As is exemplified in FIG. 12A, an isotropic pixel 12000 may include four hexagonally shaped subpixels 12500 that are located in adjacency with each other. As is exemplified herein, the four subpixels 12500 may respectively comprise four different grating patterns $P_1$, $P_2$, $P_3$ and $P_4$. However, this should not be construed as limiting. Accordingly, subpixels 12500 may for example in respective embodiments include two or three grating patterns only. Therefore, two or three of the subpixels 12500 may include identical grating patterns for example.

Reverting to the embodiment wherein isotropic pixel 12000 comprises four different grating patterns, each of said four grating patterns may differ from one another with respect to their planar grating orientation for example. More specifically, the different grating patterns may be hexagonal dot gratings having a period Λ and a dot width p. For each subpixel 12500 the hexagonal dot gratings may be rotated with respect to each other in a manner such that the resulting isotropic pixel with the different grating patterns $P_1$, $P_2$, $P_3$, and $P_4$ exhibit isotropic colour effects. For example, the grating patterns $P_1$, $P_z$ $P_3$, and $P_4$ may be rotated with respect to each by an angle α of, e.g., 10°.

According to some embodiments of the invention, the distance $Ø_{subpixel}$ between two most distant points of subpixel 12500 may for example, be at least approximately 13 times the period Λ of the hexagonal dots gratings. The distance $Ø_{isotropic\ pixel}$ defines the distance between the most distant points of isotropic pixel 12000 comprising four hexagonally shaped subpixels 12500 arranged such to form a substantially hive-like structure.

Compared to linear gratings, fewer subpixels are required when employing hexagonal dot gratings to obtain a similar degree of isotropy of the optical effect, due to the smaller rotational symmetry angle of hexagonal dot gratings. In other words, the angle of rotation to obtain rotational symmetry for hexagonal dot gratings is significantly smaller than the angle of rotational symmetry for linear gratings.

As can readily be seen with respect to FIG. 12B, at least some of the subpixels such as, for example, subpixels 12500 may overlap. Such an overlap may occur for all types of grating patterns defining a subpixel. For example, dot 12501 is shared by two subpixels 12500.

Figure 13:
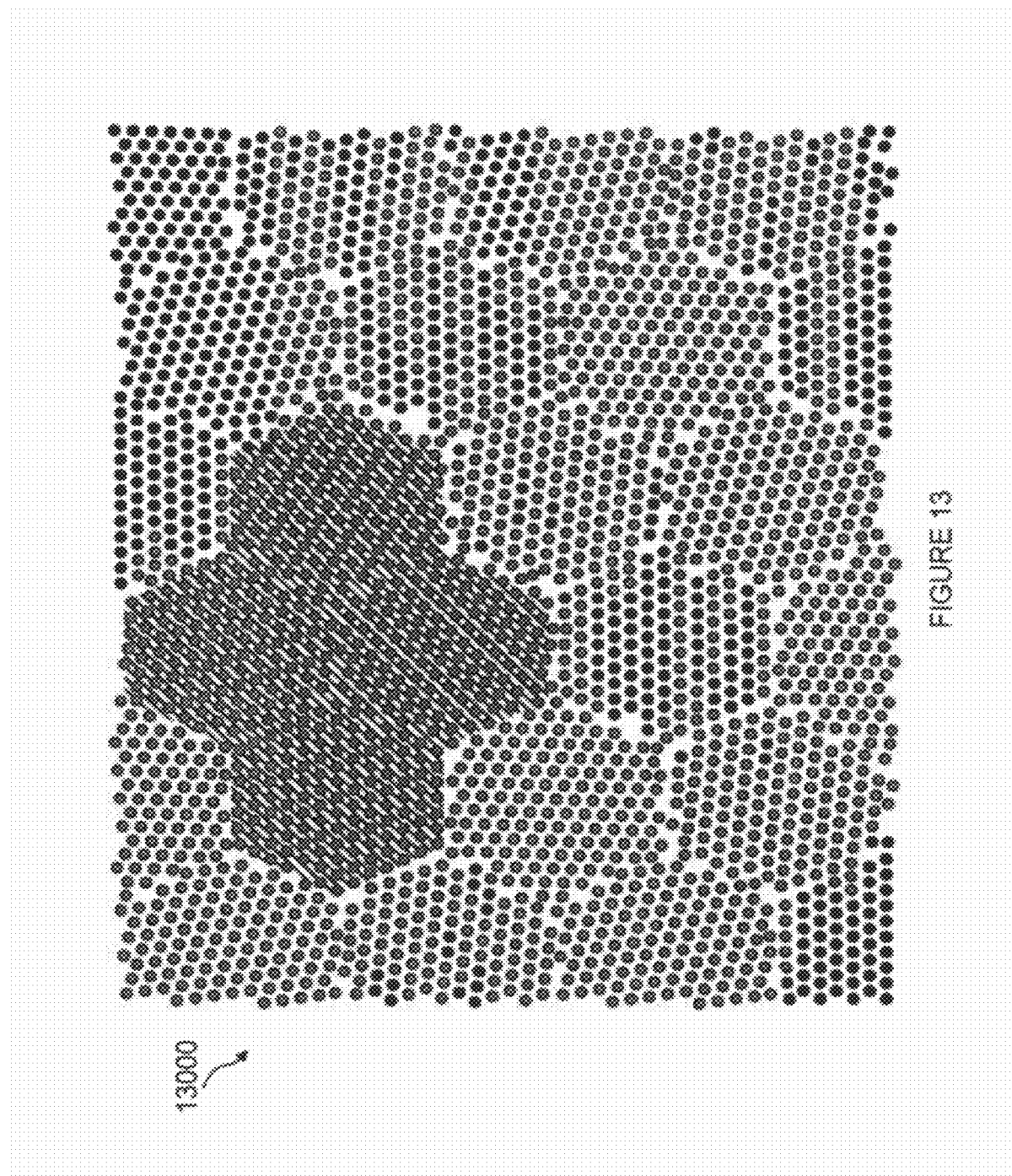
FIG. 13 is a schematic top view illustration of an isotropic colour filter comprising a plurality of hive-like structured isotropic pixels of FIG. 12B.

Additional reference is now made to FIG. 13. An isotropic optical filter 13000 includes a plurality of isotropic pixels such as, for example, isotropic pixel 12000 exemplified herein above. FIG. 13 schematically shows a detail of such an isotropic optical filter 13000, wherein one isotropic pixel 12000 is highlighted with a diagonally lined background.

Figure 14:
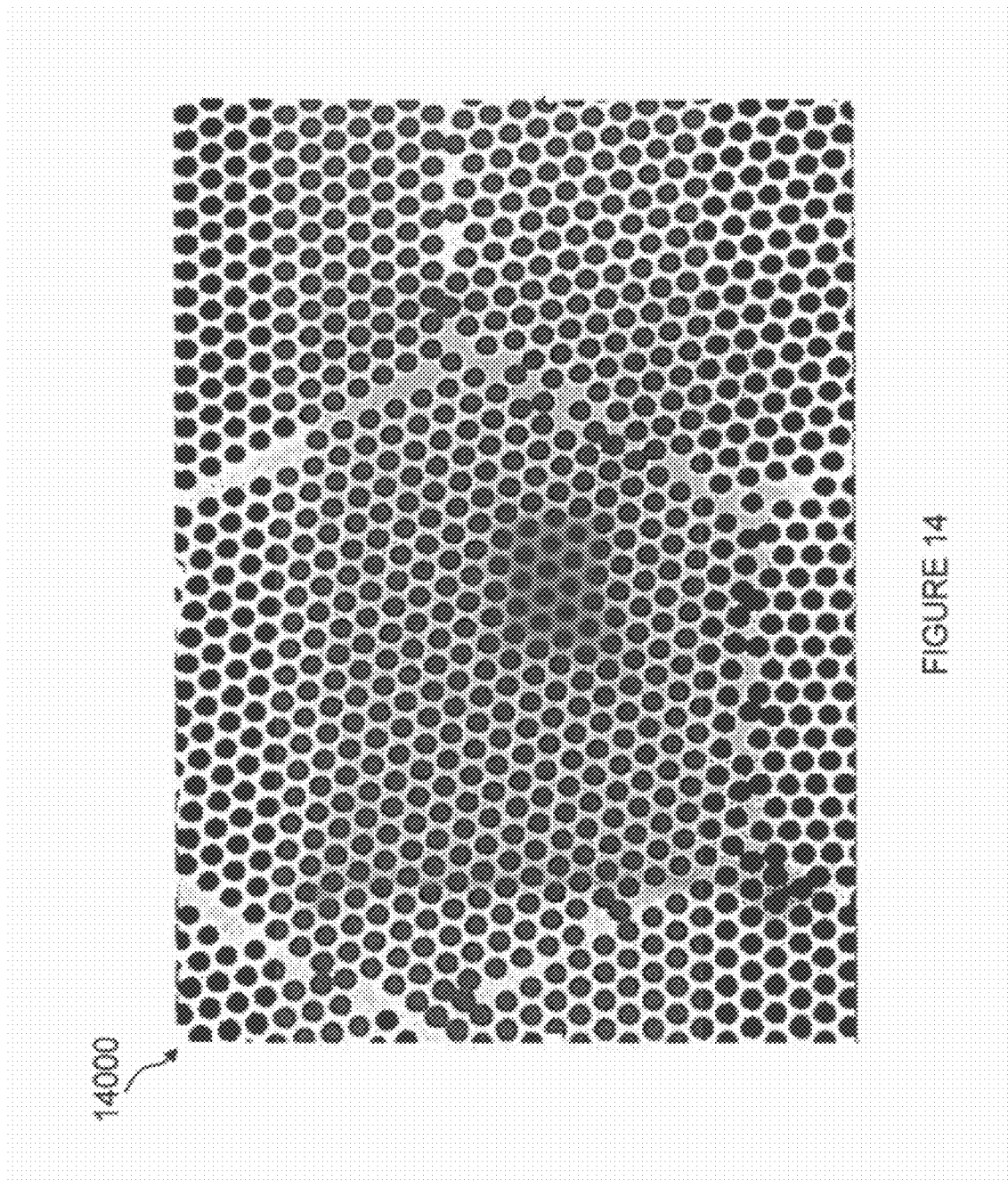
FIG. 14 shows an image of an excerpt of a silicon master sample for the implementation of the isotropic optical filter of FIG. 13.

Further reference is made to FIG. 14, which shows an image 14000, captured by SEM, of an excerpt of a silicon master sample for the implementation of isotropic optical filter 13000.

In some embodiments of the invention, the shape of a dot in grating patterns comprising dotted microstructures in the X-Y plane may be one of the following shapes: circular, rectangular, quadratic, or any other suitable planar shape. Accordingly, hexagonally shaped subpixels for example may comprise grating patterns that have a planar grating profile of a checkered or chessboard-like type. For example, in an embodiment wherein a grating pattern of a checkered type is employed, the edges of the squares that are in alignment with each other according to either the X or Y axis may be at least approximately in parallel with respect to each other, as is exemplified in FIG. 8B.

The writing—e.g., by employing e-beam writing machines—of grating patterns of being of a checkered type that comprise at least approximately parallel aligned edges may be faster compared to the writing of grating patterns of a checkered type wherein the edges are in a non-parallel arrangement.

Figure 15:
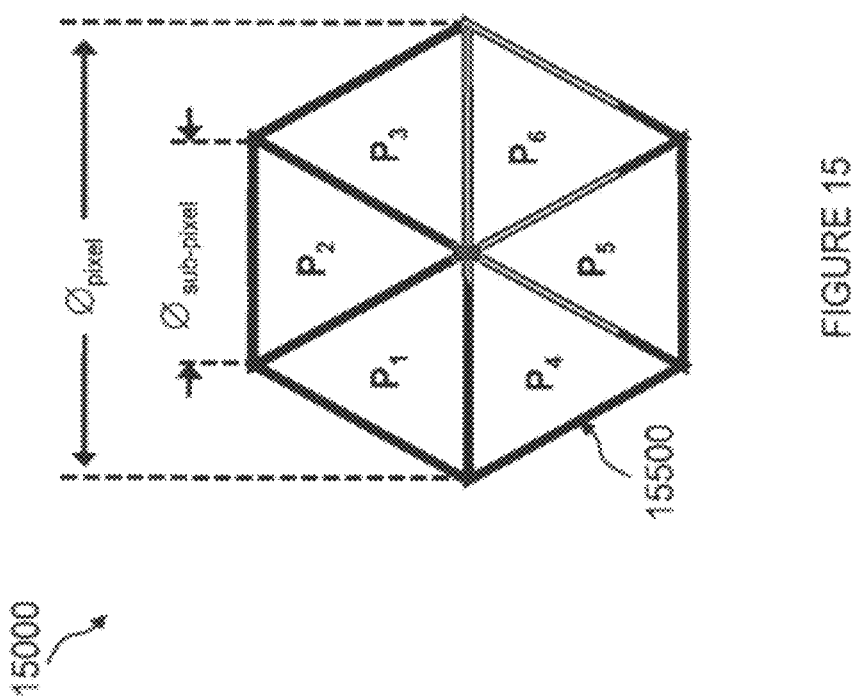
FIG. 15 is a schematic top view illustration of an isotropic pixel comprising a plurality of triangularly shaped subpixels, according to an embodiment of the invention.

Further reference is made to FIG. 15. According to an embodiment of the invention, an isotropic optical filter may include a plurality of at least approximately triangularly shaped subpixels. For example, an isotropic optical filter may comprise isotropic pixels 15000 which may be hexagonally shaped and include, e.g., six at least approximately equally triangularly shaped subpixels 15500, each of which may include grating patterns with different rotational orientations $\alpha_1$ to $\alpha_6$ arranged such to form hexagonally shaped isotropic pixel 15000.

More specifically, the triangularly shaped subpixels 15000 may be arranged with respect to each other such that one apex of all subpixels 15500 is at least approximately in alignment with the geometric center O of isotropic pixel 15000. Accordingly, the inner boundaries between subpixels 15500 delineate a star-like form having six branches running from the geometric center of isotropic pixel 15000, wherein the angle between two neighbouring branches may be at least approximately 60 degrees. However, the design of isotropic pixel 15000, as exemplified herein, should not be construed as limiting. Accordingly, isotropic pixels comprising triangular subpixels may have shapes different to the one outlined herein with respect to FIG. 15.

Figure 16:
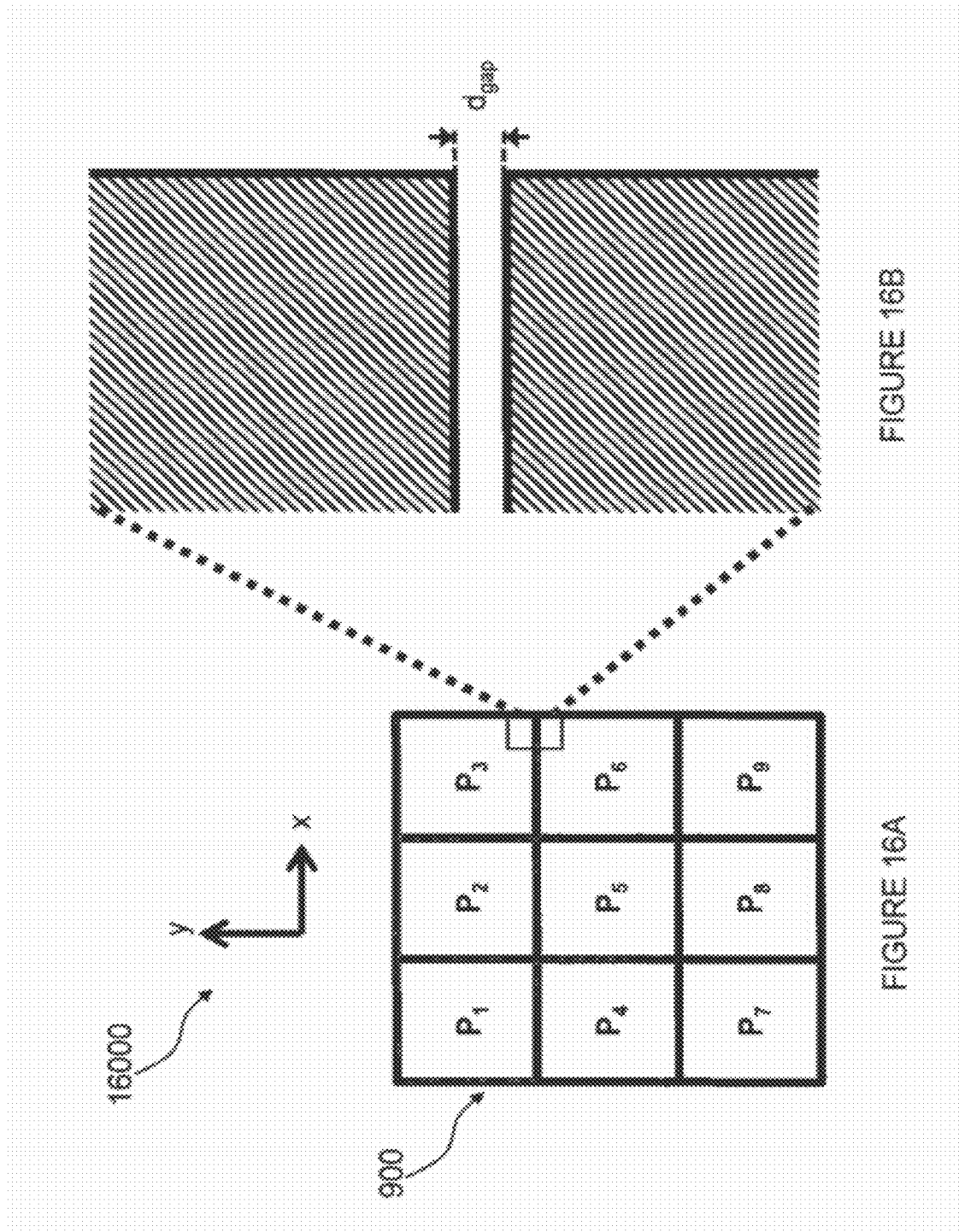
FIG. 16A is the schematic top view illustration as in FIG. 9A, wherein a selection of the grating pattern layout for enlargement is indicated.
FIG. 16B is a schematic top view illustration of the selection made in FIG. 16A, the schematic top view illustration indicating the minimal lateral distance between adjacent or neighbouring subpixels.

Further reference is made to FIGS. 16A and 16B. According to some embodiments of the invention, the lateral distance $d_{gap}$ between adjacent subpixels like, e.g., subpixels 15500 in the Y-direction, may be equal or below a certain limit, as outlined herein below in TABLE 2. The spectral characteristics or colour impression observable for a pixelated optical filter that includes subpixels meeting the requirement on the limit for the lateral distance $d_{gap}$ between each other may be more uniform than for a pixelated optical filter that includes subpixels having a lateral distance that exceeds the limit for $d_{gap}$. The reason therefor is that if the gaps between subpixels are too wide, i.e., exceed the limit for $d_{gap}$, the subpixels may become distinguishable from one another by an observer. As consequence, the uniformity of the colour impression on the observer may be reduced. The upper limit on the distance $d_{gap}$ between two neighbouring subpixels in the X-Y directions $d_{gap}$ may be, for example, $\leq 20$ µm, $\leq 10$ µm, $\leq 5$ µm, or $\leq 1$ µm.

Since the manufacturing of isotropic pixels with such small gaps between the subpixels may be rather difficult, limiting the $d_{gap}$ to the values outlined hereinabove may be challenging, especially if the master is manufactured using the replication process that is described herein below in greater detail.

Figure 17:
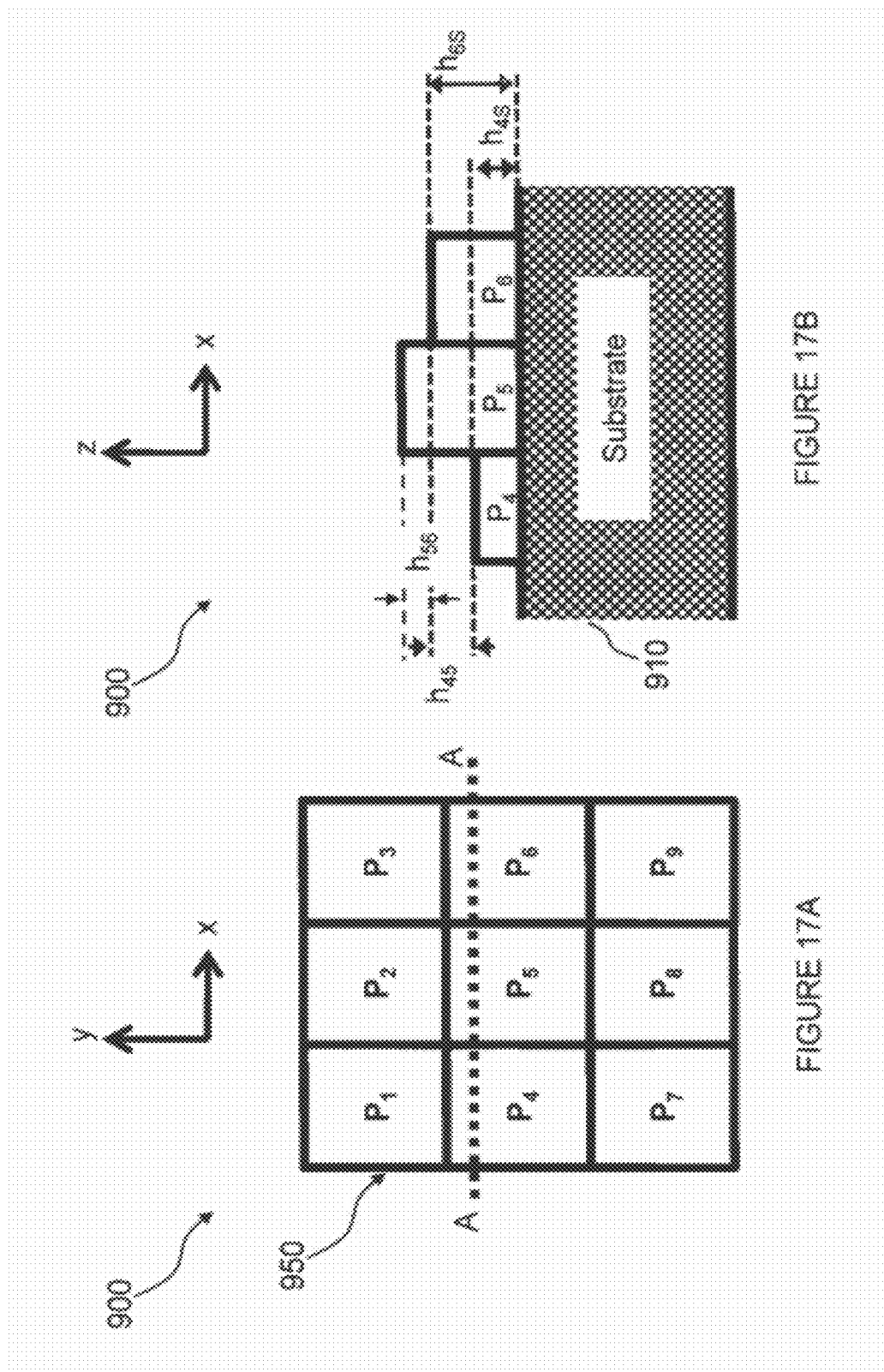
FIG. 17A is the schematic top view illustration as in FIG. 9A, wherein a cross-section line A-A is indicated.
FIG. 17B is a schematic cross-sectional side-view illustration along line A-A of FIG. 17A, to schematically illustrate the minimal difference in height between neighbouring or adjacent subpixels.

Additional reference is now made to FIGS. 17A and 17B. According to some embodiments of the invention, the differences in height (in the Z-direction), or otherwise stated, the step height $h_{ij}$ between two neighbouring surfaces (in the X-Y direction), may be below a certain limit. For example, in an embodiment like the one exemplified with isotropic pixel 900 which includes, inter alia, three grating patterns $P_4$, $P_5$ and $P_6$ and a substrate 910 with unequal height, the differences in step height $h_{ij}$ between neighbouring grating patterns and between a grating pattern and substrate 910 in the Z-direction may some embodiments of the invention be equal or below a certain height limit $h_L$. Denotation $h_{45}$ refers to the step height between grating pattern $P_4$ and $P_5$, $h_{56}$ to the step height between grating pattern $P_5$ and $P_6$, denotation $h_{4S}$ to the step height between grating pattern $P_4$ and substrate 910, and denotation $h_{6S}$ to the step height between grating pattern $P_6$ and substrate 910. For example, $h_{ij}$ and $h_{is}$ may be $\leq 1$ µm, $\leq 0.5$ µm, $\leq 200$ nm, or $\leq 100$ nm.

It should be noted that the geometry of isotropic optical filters is herein discussed and exemplified with reference to isotropic pixel 900. However, this should not be construed as limiting. Accordingly, the geometry of isotropic filters discussed herein below may thus also be implemented with respect to other isotropic optical filters according to embodiments of the invention.

Geometric measures as well as other parameters for isotropic optical filters, isotropic pixels and their subpixels listed in Table 2 below are examples only and should thus not be construed as limiting.

TABLE 2

| Parameter of the isotropic pixels and subpixels | First option of ranges | Second option range | Third option range |
|---|---|---|---|
| size $\varnothing_{subpixel}$ in x- and/or y-direction | 4 µm-250 µm | 8 µm-150 µm | 12 µm-80 µm |
| size $\varnothing_{isotropic\,pixel}$ in x- and/or y-direction | 10 µm-500 µm | 20 µm-180 µm | 30 µm-100 µm |
| number of subpixels per isotropic pixel | 2-16 | 2-12 | 3-9 |
| Gap $d_{gap}$ between subpixels | 0-5 µm | 0-2 µm | 0-1 µm |
| Step height $h_{ij}$ between different grating pattern and grating pattern and the substrate | 0-0.5 µm | 0-200 nm | 0-100 nm |

Figure 18:
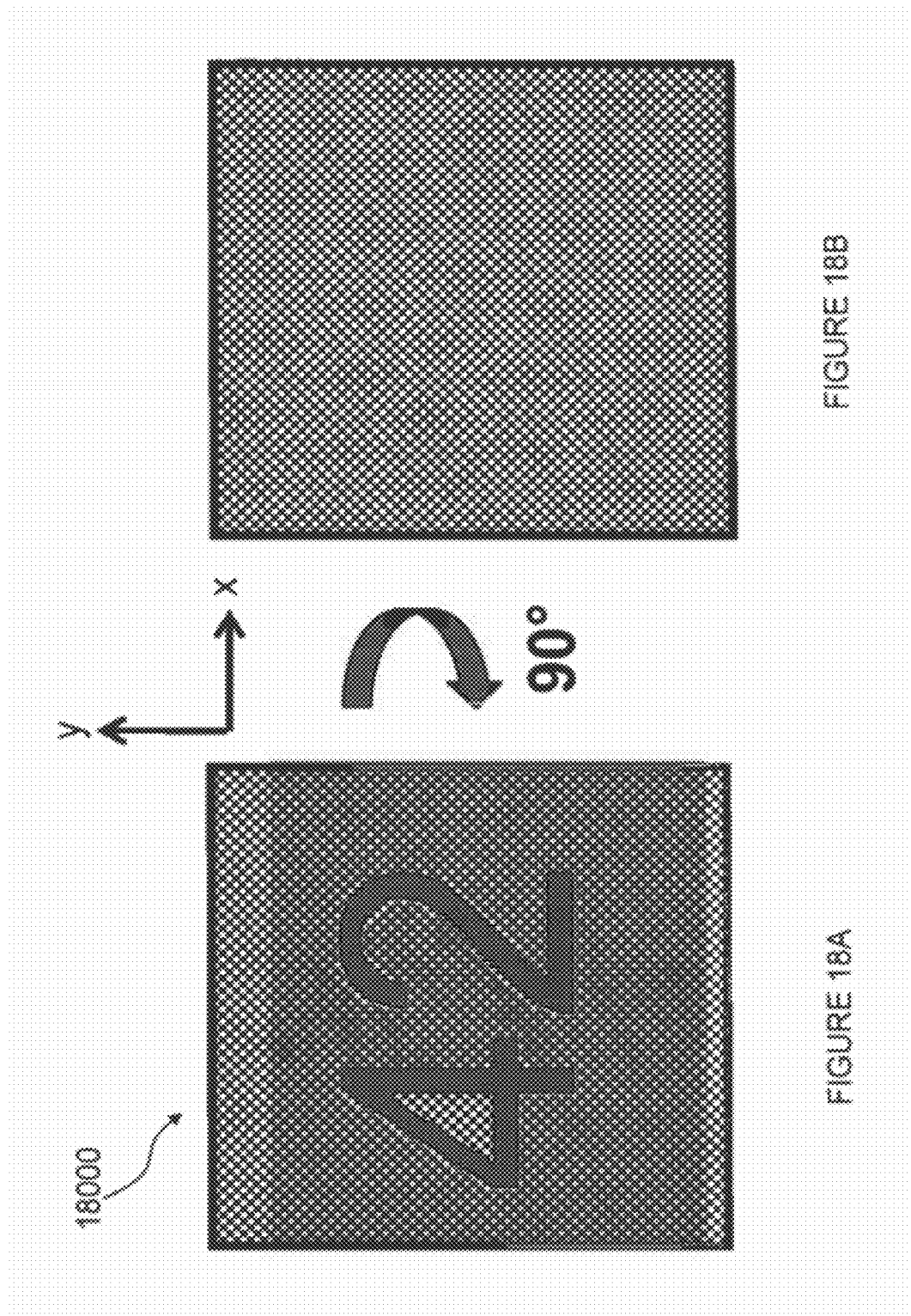
FIG. 18A is a schematic illustration of an isotropic optical filter comprising an additional security feature, in a first orientation, according to an embodiment of the invention.
FIG. 18B is a schematic illustration of the isotropic optical filter comprising the additional security feature; according to the embodiment of FIG. 18A, in the second orientation.

Further reference is now made to the FIGS. 18A and 18B. An isotropic optical filter may include or be employed, according to some embodiments of the invention, with an additional security feature, e.g., as known in the art. More specifically, an isotropic optical filter, like the one exemplified as arrangement 18000, may include according to an embodiment a plurality of subpixels comprising at least two different grating patterns defining a background area for the additional security feature. The additional security features covers a security feature area of isotropic optical filter 18000.

According to an embodiment of the invention, the background of the additional security feature provides an isotropic colour effect $C_{isotropic}$. The design of the at least two different grating patterns defining the background area may vary.

The additional security feature may be of the structure of at least one symbol such as, for example, the number "42" as exemplified herein. The symbol may additionally or alternatively be at least one of the following types: an alphanumeric symbol, a logo, a barcode, and the like.

According to an embodiment of the invention, the security feature area is defined by at least one grating pattern of a diffractive microstructure such as, for example, linear gratings.

In some embodiments of the invention, the colour effect exhibited by the background area and the security feature area may be at least approximately equal for a first tilting and rotational orientation. Accordingly, both the background area and the security feature area may exhibit the at least approximately the same colour for the same tilting and rotation angle such that the security feature is not visible or hardly visible.

According to an embodiment of the invention, isotropic optical filter 18000 may be devised such that upon rotation from the first to a second rotational orientation by, e.g., 90°, the colour of the security feature area changes wherein the colour of the background area remains unchanged. In other words, the background area exhibits an isotropic colour effect whilst the security feature area exhibits a characteristic colour effect upon rotation. Thus, the shape of the security feature area becomes visible upon rotation of isotropic optical filter 18000 to the second rotational angle. Of course, according to an embodiment of the invention, design of isotropic optical filter may be inverse, i.e., upon rotation from the first to the second rotational orientation, the background area exhibits a characteristic colour effect whilst the security feature area exhibits an isotropic colour effect.

Isotropic optical filters according to embodiments of the invention can be combined with security features based on, for example, at least one of the following: holograms, kinegrams and other first or higher order light diffraction features; optically variable effect generating features such as, for example, optical variable inks (OVI): magnetic features; micro text; barcodes; RFID; and the like.

Examples of Manufacturing Methods

It should be noted that an isotropic optical filter according to embodiments of the invention features a short range ordering and a long range ordering due to the isotropic pixel and/or subpixel array design. Such isotropic optical filters can, as a consequence, be manufactured, e.g., by employing by e-beam writing with a high control of all microstructure parameters such as, for example, the period Λ. Accordingly, the colour effects of the isotropic optical filter can be more easily tuned compared to diffractive microstructures which feature a short range ordering and a long range disordering.

Embodiments of methods for manufacturing an isotropic optical filter, as well as an array thereof, are outlined herein. Embossing processes for example may be employed for producing microstructured areas in large quantities.

More specifically, a master for a diffractive microstructure of a desired isotropic optical filter microstructure is first manufactured according to an embodiment of the invention. The master may be manufactured using, for example, e-beam writing or e-beam lithography. The desired master for an isotropic optical filter may be written with a suitable e-beam machine in a resist on a quartz substrate. Between the resist and the quartz substrate, a chromium layer may be employed having thickness of for example, about 100 nm. After the e-beam writing, the resist is developed and the chromium layer is etched (e.g., dry etched). Subsequently, the residual resist material is removed. As a result, a chromium mask may be obtained in accordance with the desired structure of the isotropic optical filter. For example, with respect to FIG. 13, the dots shown could represent chromium on quartz, and the white areas surrounding the dots may be chromium free quartz, or vice versa.

Figure 19:
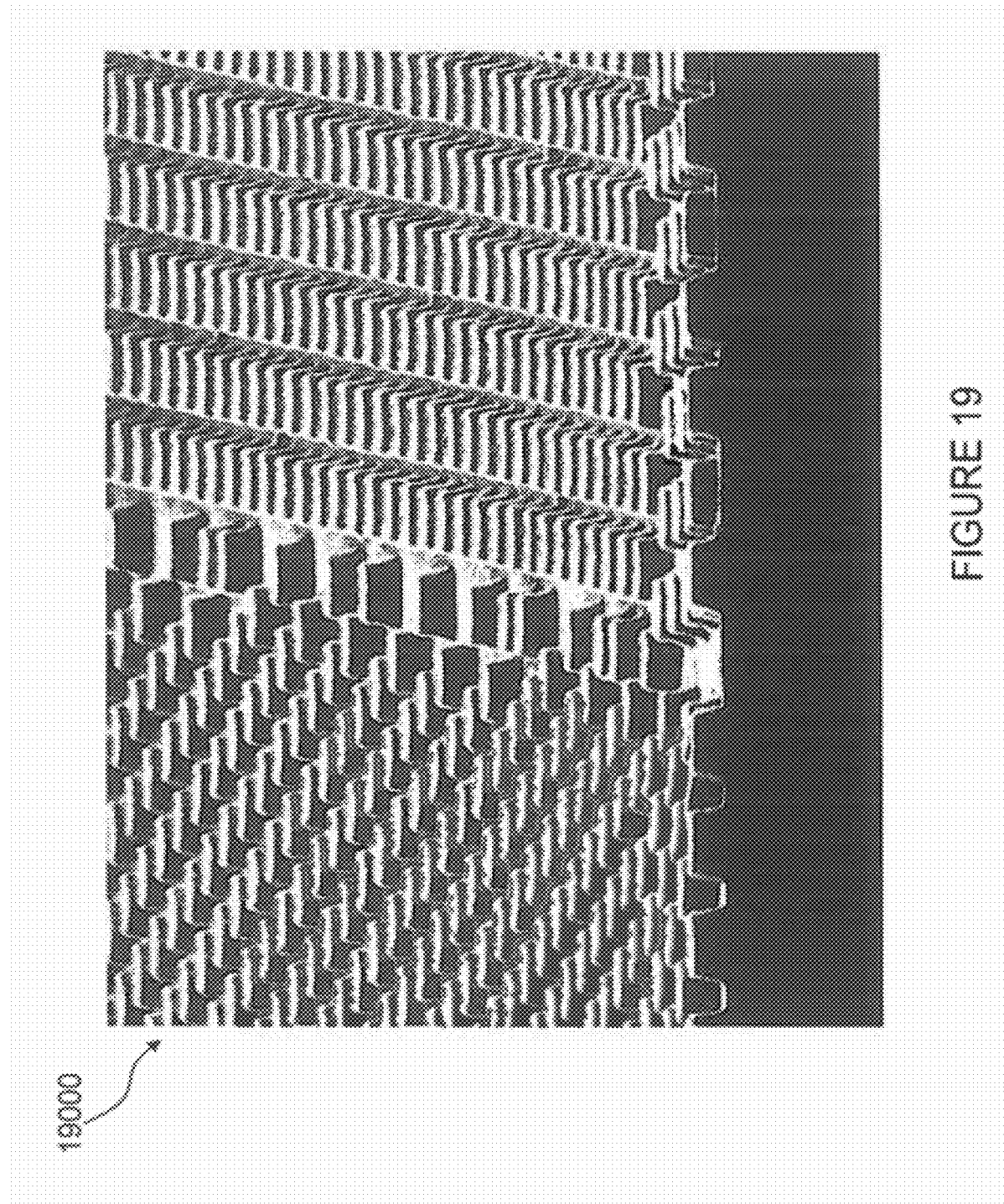
FIG. 19 shows an SEM image of a side view and partially top view of an etched quartz master.

Further reference is now made to FIG. 19. The chromium mask may then be etched in a reactive ion etching process (RIE) to transfer the mask design in the quartz substrate, resulting in an etched quartz master. By employing the RIE, the depth t of the diffractive microstructures of the isotropic optical filter can be tuned as desired. FIG. 19 shows an SEM image 19000 of a &de view and partially top view of such an etched quartz master. The border between two subpixels with different planar orientation of the diffractive microstructures is clearly visible. The depth t of the diffractive microstructures shown are approximately 200 nm, the period 550 nm and the dot diameter 400 nm. As a result, the isotropic optical filter based on this diffractive microstructure exhibits a colour effect upon tilting from red to green but no rotational colour effect.

According to some embodiments of the invention, a master may be manufactured by employing replication processes such as for example, UV-replication processes like, e.g., nanoimprint-, and sol-gel replication. More specifically, the subpixels with the different oriented periodic diffractive microstructures may be replicated on a master substrate, e.g. quartz or glass, from holohedral periodically micro-structured masters. These holohedral micro-structured masters may be embodied, for example, by one of the following: Nickel-shims, a quartz- or Si-masters.

In some embodiments of the invention, the UV replication for a certain type of subpixels may be accomplished by employing a dot shadow masks that allows only the nanoimprint- or sol-gel material to harden which is at the locations of this subpixel type. The complete master can be manufactured by repeating this replication step with shadow masks for the other subpixels with different grating patterns. During manufacturing of the complete master, the alignment of the shadow masks is such, so that the different subpixels are placed in the desired position on the substrate. For the subpixels with sizes of about some tenth of micrometer alignment marks are needed on the shadow masks.

The complete master comprising the diffractive microstructure exhibiting the isotropic colour effects can be used to electroform embossing Ni-shims. The Ni-shim can be used in a step-and-repeat embossing or replication process to produce a larger area with the diffractive microstructures. During this step-and-repeat process the zero-order diffractive microstructures can be combined with other microstructures, e.g. hologram structures and the like, to realise an even more complex design. Such complex designs are needed e.g. in payment means like for example banknotes, credit cards and cheques; personalized identification documents like, e.g., passports, visas, driver licences, identification cards; brand name products: and the like. PMMA substrates are often used for the mentioned step-and-repeat embossing or replication. From this larger area of e.g., a PMMA substrate, a further relatively thin and flexible Ni-shim can be manufactured by electroforming. The Ni-shim can be put round a roll in a roll-to-roll embossing machine. With such a machine, the PMMA substrate can be microstructured by employing UV- or hot-embossed for example in a thin embossable lacquer which is coated on a thin foil substrate (e.g., PET-foil), which may be made of, e.g. 6 μm to 12 μm thick Mylar. In some embodiments, a release layer is present between the thin foil substrate and the embossable lacquer.

Further, the foil with the embossed lacquer is put in a vacuum caster capable of deposition a high refractive index material (HRI), for example 80 nm ZnS or $TiO_2$ to obtain an isotropic optical filter. In a further step the HRI coated side of the roll is coated with glue like, e.g., lamination glue. The isotropic optical filter produced in this way can be e.g. hot-transferred onto critical items like, e.g., to banknotes, credit card substrate or they can be laminated in passports.

While the invention has been described with respect to a limited number of embodiments, these should not be construed as limitations on the scope of the invention, but rather as exemplifications of some of the embodiments. Those skilled in the art will envision other possible variations, modifications, and programs that are also within the scope of the invention. Accordingly, the scope of the invention should not be limited by what has thus far been described.

What is claimed is:

1. An isotropic optical filter comprising:
   high-index refraction material positioned between low-index-refraction matter, the isotropic filter defining a X-Y plane and a z-axis orthogonal to the x-y plane;
   wherein at least some of the high-index refraction material has a grated structure and lateral and vertical dimensions with respect to the low-index-refraction matter such that the high-index refraction material is operative to act as a zero-order diffractive filter for visible light incident on said isotropic optical filter;
   wherein the grated structure comprises at least two different grating patterns, said at least two different grating patterns differing from each other in that i) a planar grating orientation of a first of the two different grating patterns is different from a planar grating orientation of a second of the two different grating patterns, ii) a grating period of the first of the two different grating patterns is different from a grating period of the second of the two different grating patterns, or iii) a grating depth of the first of the two different grating patterns is different from a grating depth of the second of the two different grating patterns,
   wherein said at least two different grating patterns have grating periods smaller than 500 nm;
   wherein each of the at least two grating patterns defines a subpixel; and
   wherein a plurality of subpixels is operative to outcouple incident light to at least two zero-order wavelength spectra respective of the at least two grating patterns such to exhibit a characteristic color effect for each viewing angle, the viewing angle being defined as an angle relative to the Z-axis, the at least two grating patterns exhibiting a change of the characteristic color effect relative to a change of the viewing angle, the at least two grating patterns further exhibiting a substantial unchanged characteristic color effect for a fixed viewing angle and a rotation of the isotropic optical filter around any axis parallel to the Z-axis, said substantial unchanged characteristic color effect being defined as a weak color effect defined as hardly recognizable to the human eye.

2. The isotropic optical filter according to claim 1, wherein the plurality of subpixels have a lateral dimension of ≤250 μm.

3. The isotropic optical filter according to claim 1, wherein the plurality of subpixels have a lateral dimension of ≤80 μm.

4. The isotropic optical filter according to claim 1, wherein the grated structure has at least one of the following structures: a linear grating structure, a chessboard-like structure, and a dotted structure.

5. The isotropic optical filter according to claim 1, wherein the plurality of subpixels are arranged in a matrix layout.

6. The isotropic optical filter according to claim 1, wherein the plurality of subpixels has at least approximately one of the following shapes: circular, and polygonal.

7. The isotropic optical filter according to claim 1, wherein the plurality of subpixels comprises at least one subpixel that includes in addition to the at least two grating patterns, a high-index refraction material that is free of microstructured grating.

8. The isotropic optical filter according to claim 1, wherein the lateral distance dgap between neighbouring subpixels is ≤5 μm.

9. The isotropic optical filter according to claim 1, wherein the difference in height between two neighbouring subpixels is ≤0.2 μm.

10. A method for manufacturing an isotropic colour filter according to claim 1, comprising the employment of at least one of the following process: embossing, and replication.

11. The method according to claim 10, wherein the replication process comprises at least one of the following processes: ultraviolet-replication processes, and hot-embossing processes.

12. A method for manufacturing an isotropic colour filter according to claim 1, wherein the planar grating orientation of the first of the two different grating patterns is different from the planar grating orientation of the second of the two different grating patterns.

13. A method for manufacturing an isotropic colour filter according to claim 1, wherein the grating period of the first of the two different grating patterns is different from the grating period of the second of the two different grating patterns.

14. A method for manufacturing an isotropic colour filter according to claim 1, wherein the grating depth of the first of the two different grating patterns is different from the grating depth of the second of the two different grating patterns.

* * * * *